United States Patent [19]
Toyoda et al.

[11] Patent Number: 5,881,233
[45] Date of Patent: Mar. 9, 1999

[54] FACSIMILE MAIL APPARATUS

[75] Inventors: Kiyoshi Toyoda; Tatsuo Bandou, both of Tokyo; Toshihisa Sawada, Chiba-ken, all of Japan

[73] Assignee: Matsushita Electric Industrial Co., Ltd., Osaka, Japan

[21] Appl. No.: 608,199

[22] Filed: Feb. 28, 1996

[30] Foreign Application Priority Data

Mar. 6, 1995 [JP] Japan .................................. 7-045847

[51] Int. Cl.⁶ ........................................................ H04N 1/00
[52] U.S. Cl. ...................... 395/200.48; 358/402; 358/440
[58] Field of Search .................... 395/200.01, 200.04, 395/200.09, 200.3, 200.48, 200.36; 358/902, 400, 405, 440; 364/514 A, 514 R

[56] References Cited

U.S. PATENT DOCUMENTS

| 4,941,170 | 7/1990 | Herbst ................................. 358/402 X |
| 5,115,326 | 5/1992 | Burgess et al. ......................... 358/440 |
| 5,461,488 | 10/1995 | Witek . |
| 5,479,411 | 12/1995 | Klein .................................. 358/402 X |
| 5,499,108 | 3/1996 | Cotte et al. ............................ 358/400 |

FOREIGN PATENT DOCUMENTS

| 0429072 | 5/1991 | European Pat. Off. . |
| 0 581 722 | 2/1994 | European Pat. Off. . |
| 0615377 | 9/1994 | European Pat. Off. . |
| 2172348 | 7/1990 | Japan . |
| 03-245 655 | 11/1991 | Japan . |
| 06-350 641 | 12/1994 | Japan . |
| 08-022 503 | 1/1996 | Japan . |
| 9209169 | 5/1992 | WIPO . |
| 9403994 | 2/1994 | WIPO . |
| 9 408 419 | 4/1994 | WIPO . |

*Primary Examiner*—Melanie Kemper
*Attorney, Agent, or Firm*—Pollock, Vande Sande & Amernick

[57] ABSTRACT

An electronic mail system connected to a network includes a section for converting an image of a document surface into corresponding document image data, and a section for compressing the document image data into compression-resultant image data. The electronic mail system also includes a section for converting the compression-resultant image data into corresponding image data of a given electronic-mail format, a section for receiving information of an electronic-mail destination address, and a section for transmitting the image data of the electronic-mail format toward the electronic-mail destination address via the network. The electronic mail system may further include a section for receiving image data in an electronic mail, a section for converting the received image data into corresponding received image data of a given facsimile format, a section for expanding the received image data of the facsimile format into expansion-resultant image data, and a section for printing the expansion-resultant image data.

27 Claims, 33 Drawing Sheets

FIG. 17

```
31 ⎰ Content-Type: text/plain
   ⎱ Subject: !!$

32 ⎧ !ID
   ⎪ toyoda                      ...SENDER ID
   ⎪
   ⎪ !LIST
   ⎨ kawa @ aaa.bbb.co.jp         ...LIST OF DESTINATION
   ⎪ hana @ xxx.yyy.co.jp            MAIL ADDRESSES
   ⎪ yama @ mmm.nnn.edu
   ⎪
   ⎪ !FROM
   ⎩ toyoda @ mei.co.jp           ...SOURCE ADDRESS
```

FACSIMILE MAIL APPARATUS

BACKGROUND OF THE INVENTION

1. Field of the Invention

This invention relates to an electronic mail system which can handle image information.

2. Description of the Prior Art

Japanese published unexamined patent application 2-172348 discloses a facsimile apparatus which includes an interface for connection with a computer network, and a controller for enabling an electronic mail to be outputted to the computer network via the interface. The facsimile apparatus is also connected to a telephone line to receive and output image information from and to the telephone line. In Japanese application 2-172348, the electronic mail outputted to the computer network represents a facsimile transmission result report or a facsimile reception result report rather than image information.

U.S. Pat. No. 5,479,411 discloses that voice, facsimile, and electronic mail messaging is integrated in a system which converts e-mail messages into voice-and-fax messages. An e-mail message is parsed into voiceable, prose, segments and non-voiceable, non-prose, segments. Prose segments are converted into voice message segments via text-to-speech facilities. Each non-prose segment is converted into a fax segment. Voice pointers to fax segments are inserted into the voice message, in places corresponding to the non-prose segments in the e-mail message. The voice file and fax file are then stored for subsequent delivery of the message as an integrated voice-and-fax message. Conversion of integrated voice-and-fax messages into e-mail messages is likewise envisioned.

SUMMARY OF THE INVENTION

It is an object of this invention to provide an improved electronic mail system.

A first aspect of this invention provides an electronic mail system connected to a network which comprises means for converting an image of a document surface into corresponding document image data; means for compressing the document image data into compression-resultant image data; means for converting the compression-resultant image data into corresponding image data of a given electronic-mail format; means for receiving information of an electronic-mail destination address; and means for transmitting the image data of the electronic-mail format toward the electronic-mail destination address via the network.

A second aspect of this invention is based on the first aspect thereof, and provides an electronic mail system further comprising means for receiving image data in an electronic mail: means for converting the received image data into corresponding received image data of a given facsimile format; means for expanding the received image data of the facsimile format into expansion-resultant image data; and means for printing the expansion-resultant image data.

A third aspect of this invention is based on the first aspect thereof, and provides an electronic mail system further comprising means for transmitting character code data by an electronic mail.

A fourth aspect of this invention is based on the first aspect thereof, and provides an electronic mail system wherein the destination-address receiving means comprises means for recognizing an electronic-mail destination address in a given position of the image data.

A fifth aspect of this invention is based on the first aspect thereof, and provides an electronic mail system further comprising means for receiving information of an electronic-mail sender address as information of an electronic-mail source address, and means for, in cases where a transmission failure occurs, informing the electronic-mail source address of the transmission failure.

A sixth aspect of this invention is based on the first aspect thereof, and provides an electronic mail system further comprising means for receiving audio data, means for integrating the audio data and the image data into integration-resultant data, and means for transmitting the integration-resultant data as a single electronic mail.

A seventh aspect of this invention is based on the first aspect thereof, and provides an electronic mail system further comprising means for receiving moving-picture data, means for integrating the moving-picture data and the image data into integration-resultant data, and means for transmitting the integration-resultant data as a single electronic mail.

An eighth aspect of this invention is based on the third aspect thereof, and provides an electronic mail system further comprising means for analyzing a character sequence in a given position of received character code data, and means for implementing a process in response to a result of said analyzing.

A ninth aspect of this invention is based on the eighth aspect thereof, and provides an electronic mail system further comprising means for, in cases where the analyzed character sequence indicates registration of a destination mail address, registering sender ID information in a subsequent character sequence and a plurality of destination mail addresses while providing a correspondence relation between the sender ID information and the destination mail addresses, and means for, in cases where sender ID information is received during mail transmission and the sender ID information is equal to the registered sender ID information, indicating the corresponding destination mail addresses and selecting a necessary destination from among the destination mail addresses.

A tenth aspect of this invention is based on the eighth aspect thereof, and provides an electronic mail system further comprising means for, in cases where the analyzed character sequence indicates registration of a source mail address, registering sender ID information in a subsequent character sequence and a source mail address while providing a correspondence relation between the sender ID information and the source mail address, and means for, in cases where sender ID information is received during mail transmission and the sender ID information is equal to the registered sender ID information, receiving the corresponding source mail address as a source.

An eleventh aspect of this invention is based on the ninth aspect thereof, and provides an electronic mail system further comprising means for, in cases where sender ID information is received during mail transmission and the sender ID information is equal to the registered sender ID information, writing information of a source mail address corresponding to the sender ID information into a header of a mail as a source.

A twelfth aspect of this invention is based on the second aspect thereof, and provides an electronic mail system further comprising means for providing a connection to a telephone line, and means for selectively transmitting the image data via the connection to the telephone line according to a facsimile procedure or via the network according to an electronic-mail procedure.

A thirteenth aspect of this invention is based on the twelfth aspect thereof, and provides an electronic mail system further comprising means for analyzing a character sequence in a given position of character code data in a received electronic mail, means for, in cases where the analyzed character sequence indicates wait for facsimile data reception, recognizing a notice electronic-mail address in a subsequent character sequence, means for, in cases where image data is received via the connection to the telephone line according to a facsimile procedure after the notice electronic-mail address is recognized, transmitting an electronic mail representative of a reception notice to the notice electronic-mail address.

A fourteenth aspect of this invention is based on the twelfth aspect thereof, and provides an electronic mail system further comprising means for analyzing a first character sequence in a given position of a header of image data in a received electronic mail, means for, in cases where the analyzed character sequence indicates facsimile transmission, recognizing a second character sequence in a given position of the header except the first character sequence as a facsimile number, and means for transmitting the received image data toward the facsimile number via the connection to the telephone line according to a facsimile procedure.

A fifteenth aspect of this invention is based on the first aspect thereof, and provides an electronic mail system further comprising means for identifying a country having a destination in response to the destination address, means for generating information of standard time in the identified country, and means for transmitting the image data as an electronic mail at a desired moment expressed according to the standard time in the identified country.

A sixteenth aspect of this invention is based on the second aspect thereof, and provides an electronic mail system further comprising means for registering a plurality of electronic-mail addresses, means for storing and managing image data transmitted by an electronic mail for each of the electronic-mail addresses, means for setting pass words for the respective electronic-mail addresses, and means for outputting the stored image data when a related pass word is received.

A seventeenth aspect of this invention is based on the sixteenth aspect thereof, and provides an electronic mail system further comprising means for generating information of a cover sheet for each of the electronic-mail addresses, and means for adding the information of the cover sheet and outputting a resultant of said adding.

An eighteenth aspect of this invention is based on the second aspect thereof, and provides an electronic mail system further comprising means for, in cases where a first electronic mail is received, transmitting a second electronic mail representative of reception of the first electronic mail to a sender electronic-mail address related to the first electronic mail.

A nineteenth aspect of this invention is based on the second aspect thereof, and provides an electronic mail system further comprising means for writing reception ID information for each received electronic mail, means for providing a correspondence relation between a sender electronic-mail address related to the received electronic mail and reception ID information, and means for, in cases where the reception ID information is received, transmitting a conformation electronic mail to the sender electronic-mail address.

A twentieth aspect of this invention is based on the second aspect thereof, and provides an electronic mail system further comprising means for, in cases where transmission of a received electronic mail fails, printing information representative of a transmission failure, and means for outputting information of a first page of the image data.

A twenty-first aspect of this invention is based on the first aspect thereof, and provides an electronic mail system further comprising means for receiving character code data by an electronic mail.

BRIEF DESCRIPTION OF THE DRAWINGS

FIG. 17 is a diagram of a part of an example of an e-mail in a given format.

DESCRIPTION OF THE PREFERRED EMBODIMENTS

First Embodiment

Figure 1:
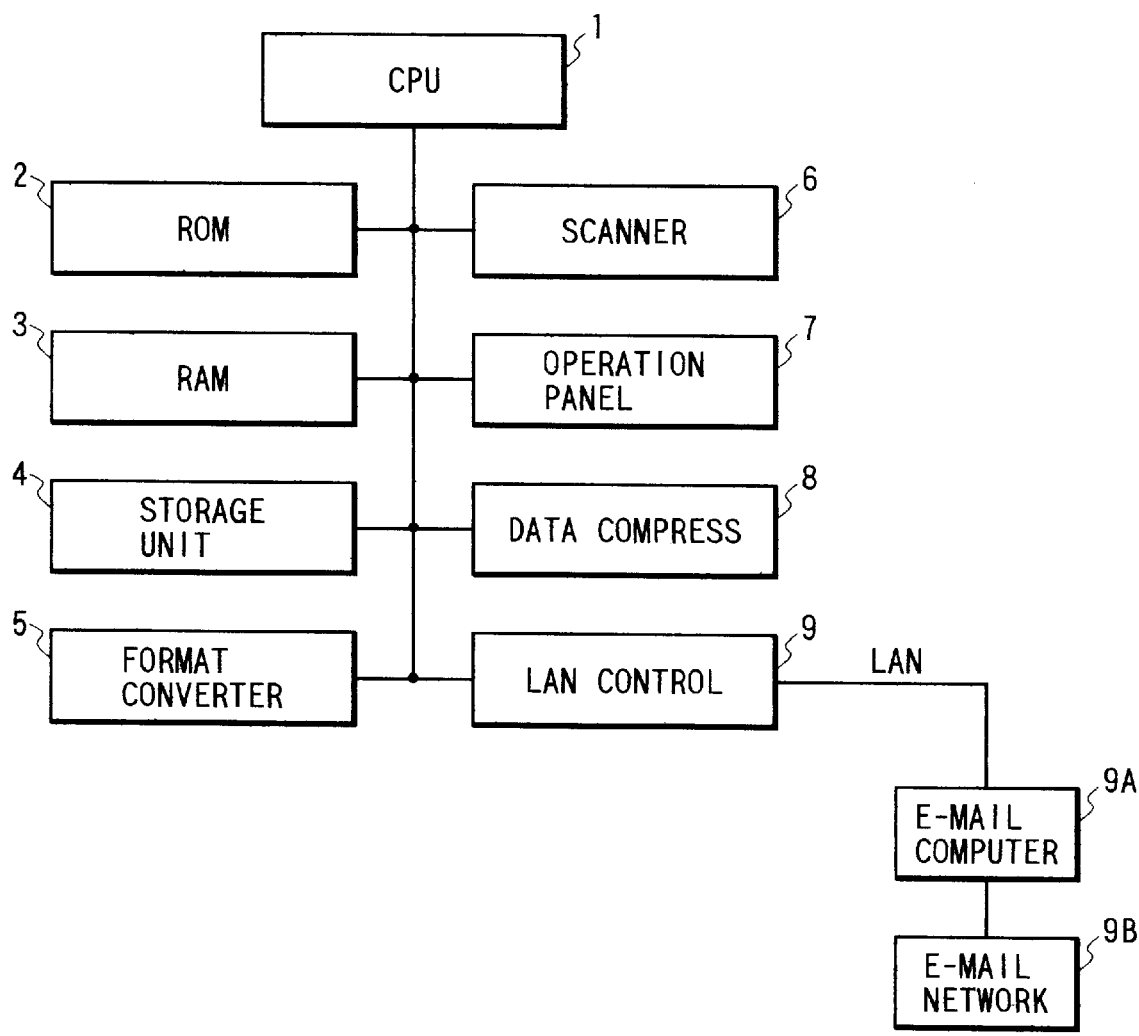
FIG. 1 is a block diagram of an electronic mail system according to a first embodiment of this invention.

With reference to FIG. 1, an electronic mail system includes a CPU 1, a ROM 2, a RAM 3, a storage unit 4, a format converter 5, a scanner 6, an operation panel 7, a data compressor 8, and a LAN (local area network) controller 9 which are electrically connected via a bus line.

The CPU 1 operates in accordance with a program stored in the ROM 2. The CPU 1 provides a work area in the RAM 3, and accesses and uses the work area during signal processing. The storage unit 4 includes, for example, a hard disk device which is used in storing data including compression-resultant image data of a facsimile format. The format converter 5 changes compression-resultant image data of the facsimile format into corresponding image data of the e-mail (electronic mail) format. The scanner 6 converts an image of, for example, a document sheet surface into corresponding binary image data (corresponding bi-level image data). The operation panel 7 has a key board, a start button, and other buttons. Information of the destination or the address of an e-mail to be transmitted can be inputted into the electronic mail system by operating the key board on the operation panel 7. The scanner 6 can be activated by operating the start button on the operation panel 7. The data compressor 8 serves to compress binary image data (bi-level image data) which is generated by the scanner 6. The LAN controller 9 includes a LAN interface.

The LAN controller 9 is connected via a LAN to an e-mail computer 9A. The e-mail computer 9A is connected to an e-mail network such as the Internet.

Figure 2:
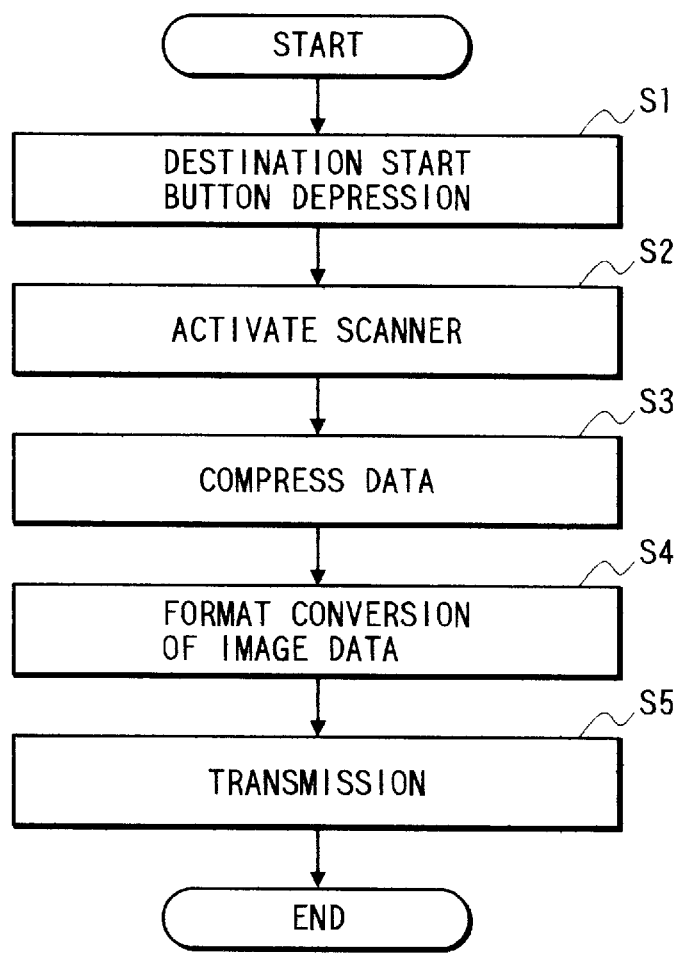
FIG. 2 is a flowchart of a segment of a program for controlling a CPU in FIG. 1.

As previously described, the CPU 1 operates in accordance with a program stored in the ROM 2. FIG. 2 is a flowchart of a segment of the program. In the case where the transmission of information on a document sheet is required, the sheet is placed in the scanner 6 and information of a desired destination is inputted via the operation panel 7. Further, the start button on the operation panel 7 is depressed.

With reference to FIG. 2, a first step Si in the program segment decides whether or not information of the destination or the address of an e-mail to be transmitted has been inputted via the operation panel 7. In addition, the step S1 decides whether or not the start button on the operation panel 7 has been depressed. In the case where information of the destination of an e-mail to be transmitted has been inputted and the start button on the operation panel 7 has been depressed, the program advances from the step S1 to a step S2. Otherwise, the program repeats the step S1. Thus, the step S1 waits the reception of an e-mail destination and the depression of the start button.

The step S2 activates the scanner 6 so that an image of the surface of a document sheet in the scanner 6 is converted by the scanner 6 into corresponding binary image data (corresponding bi-level image data). A step S3 following the step S2 transfers the binary image data from the scanner 6 to the data compressor 8.

Then, the step S3 activates the data compressor 8 so that the binary image data is compressed by the device 8 into compression-resultant image data of a given facsimile format. Further, the step S3 transfers the compression-resultant image data of the facsimile format from the data compressor 8 to the storage unit 4 before storing the compression-resultant image data of the facsimile format into the storage unit 4. In the case where the transmission of information on a plurality of document sheets (that is, a plurality of pages) is required, the document sheets are sequentially scanned by the device 6 and the compression-resultant image data of the facsimile format is stored into the storage unit 4 as a single file having a plurality of pages.

A step S4 following the step S3 transfers the compression-resultant image data of the facsimile format from the storage unit 4 to the format converter 5. The step S4 activates the format converter 5 so that the compression-resultant image data of the facsimile format is converted by the device 5 into corresponding image data of the e-mail format. In addition, the step S4 transfers the image data of the e-mail format from the format converter 5 to the storage unit 4 before storing the image data of the e-mail format into the storage unit 4.

A step S5 subsequent to the step S4 transfers the image data of the e-mail format from the storage unit 4 to the LAN controller 9. The step S5 activates the LAN controller 9 so that the image data of the e-mail format is further transferred from the LAN controller 9 to the e-mail computer 9A. The image data of the e-mail format, that is, an e-mail, is transmitted from the e-mail computer 9A to the destination via the e-mail network 9B. After the step S5, the current execution cycle of the program segment ends.

The image data generated by the scanner 6 is of the binary type or the bi-level type. The compression-resultant image data of the facsimile format which is generated by the data compressor 8 is also of the binary type or the bi-level type. The format converter 5 successively encodes pieces of the compression-resultant facsimile image data into corresponding 7-bit character code words respectively. The 7-bit character code words compose text-encoded image data. Thus, the format converter 5 changes the compression-resultant facsimile image data into the corresponding text-encoded image data. The format converter 5 adds a header of a given format to the text-encoded image data, thereby completing the image data of the e-mail format. The header includes information of the destination, information of a source address, information of the data format, and information of the manner of conversion from the image data into the character code words. The format related to the header and the manner of conversion from the image data into the character code words are in conformity with the Internet e-main standards referred to as MIME (Multipurpose Internet Mail Extensions).

Second Embodiment

Figure 3:
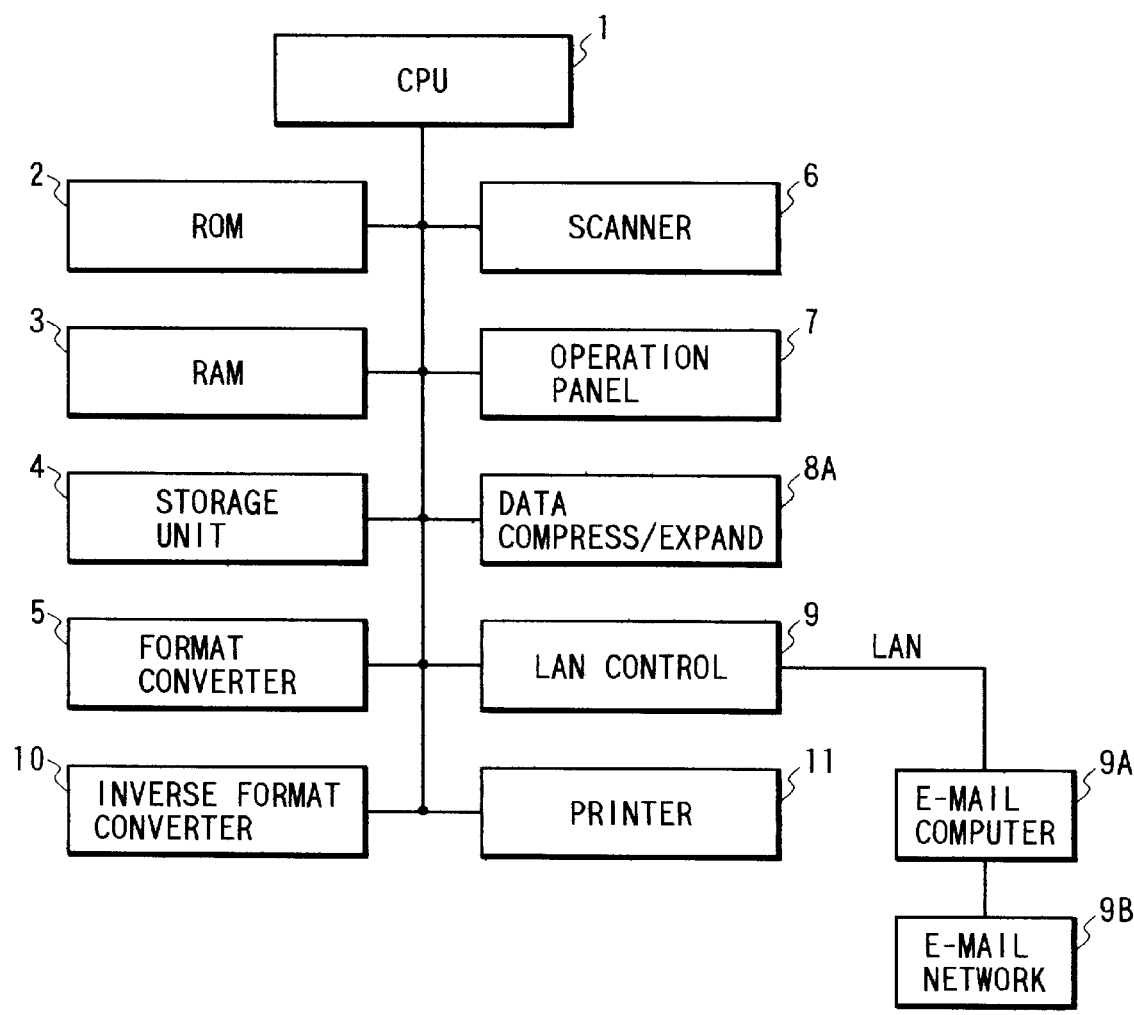
FIG. 3 is a block diagram of an electronic mail system according to a second embodiment of this invention.

FIG. 3 shows a second embodiment of this invention which is similar to the embodiment of FIGS. 1 and 2 except for an additional arrangement described hereinafter.

With reference to FIG. 3, an electronic mail system includes a CPU 1, a ROM 2, a RAM 3, a storage unit 4, a format converter 5, a scanner 6, an operation panel 7, a data compressor/expander 8A, a LAN (local area network) controller 9, an inverse format converter 10, and a printer 11 which are electrically connected via a bus line. The inverse format converter 10 changes image data of the e-mail format into corresponding image data of a given facsimile format.

The data compressor/expander 8A replaces the data compressor 8 in FIG. 1. The data compressor/expander 8A serves to compress binary image data (bi-level image data) generated by the scanner 6. In addition, the data compressor/expander 8A serves to expand image data of the facsimile format into expansion-resultant binary image data (expansion-resultant bi-level image data). The printer 11 serves to print out expansion-resultant binary image data.

Figure 4:
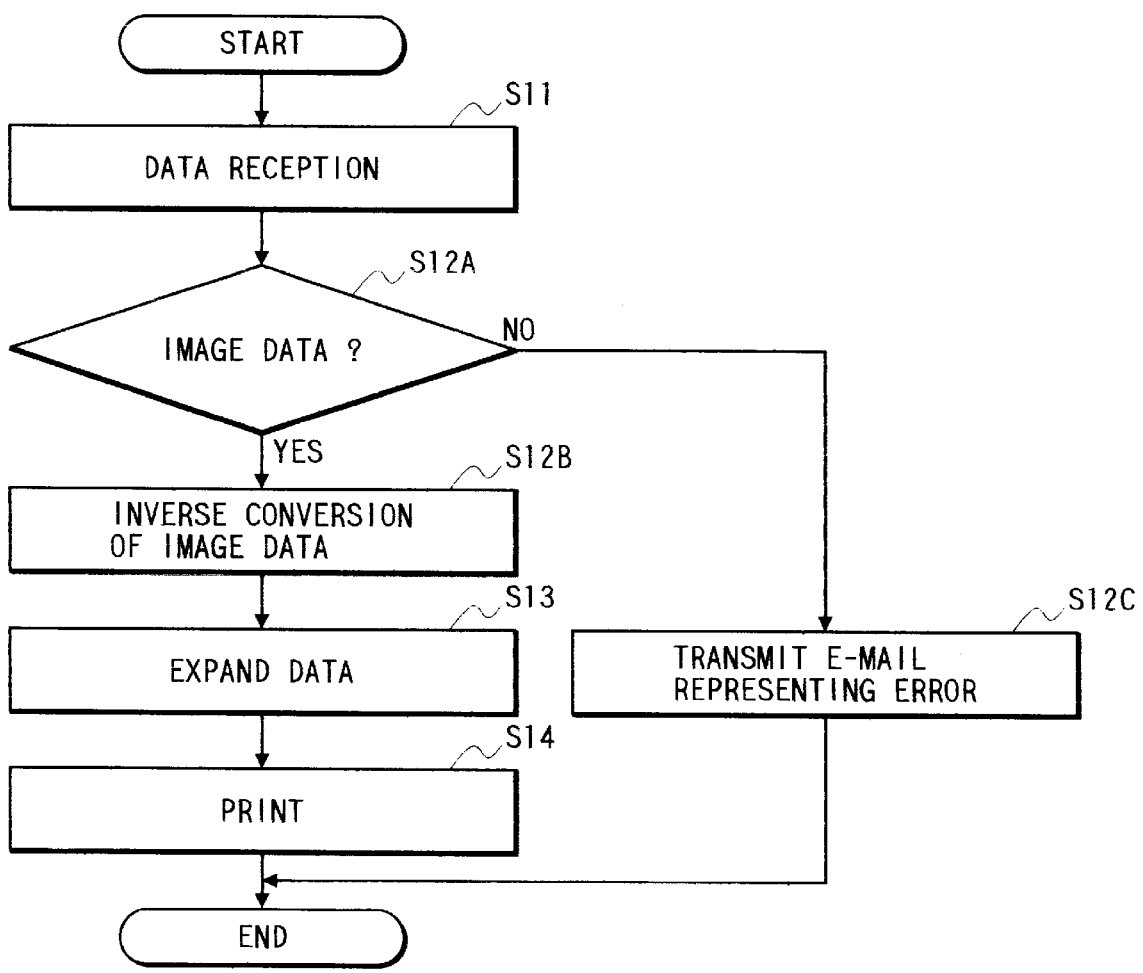
FIG. 4 is a flowchart of a segment of a program for controlling a CPU in FIG. 3.

The CPU 1 operates in accordance with a program stored in the ROM 2. FIG. 4 is a flowchart of a segment of the program. With reference to FIG. 4, a first step S 11 in the program segment decides whether or not data of the e-mail format has been received by the LAN controller 9. In the case where data of the e-mail format has been received, the step S11 transfers the received data of the e-mail format to the storage unit 4. The step S11 controls the storage unit 4 so that the received data of the e-mail format is stored into the storage unit 4. In the case where data of the e-mail format has not yet been received, the program repeats the step S11. Thus, the step S11 waits the reception of data of the e-mail format.

A step S12A following the step S11 decides whether or not the received data of the e-mail format agrees with image data of the e-mail format by referring to related information in the header of the received data of the e-mail format. When the received data agrees with image data, the program advances from the step S12A to a step S12B. When the received data differs from image data, the program advances from the step S12A to a step S12C. The step S12B transfers the received data of the e-mail format from the storage unit 4 to the inverse format converter 10. The step S12B activates the inverse format converter 10 so that the received data of the e-mail format is converted by the device 10 into corresponding image data of a given facsimile format. The step 12C controls the LAN controller 9 so that a responsive e-mail representing an error will be transmitted to the source concerning the received data of the e-mail format. After the step S12C, the current execution cycle of the program segment ends.

A step S13 following the step S12B transfers the image data of the facsimile format from the inverse format converter 10 to the data compressor/expander 8A. The step S13 activates the data compressor/expander 8A so that the image data of the facsimile format is expanded by the device 8A into expansion-resultant binary image data (expansion-resultant bi-level image data). Further, the step S13 transfers the expansion-resultant binary image data from the data compressor/expander 8A to the storage unit 4 before storing the expansion-resultant binary image data into the storage unit 4.

A step S14 subsequent to the step S13 transfers the expansion-resultant binary image data from the storage unit 4 to the printer 11. The step S14 activates the printer 11 so that the expansion-resultant binary image data is visualized or printed out by the device 11. After the step S14, the current execution cycle of the program segment ends.

As previously described, the inverse format converter 10 changes the received data of the e-mail format into the corresponding image data of the facsimile format. Specifically, the inverse format converter 10 extracts text-encoded image data from the received data of the e-mail format. Then, the inverse format converter 10 changes the text-encoded image data into corresponding binary (bi-level) image data of the facsimile format.

Third Embodiment

Figure 5:
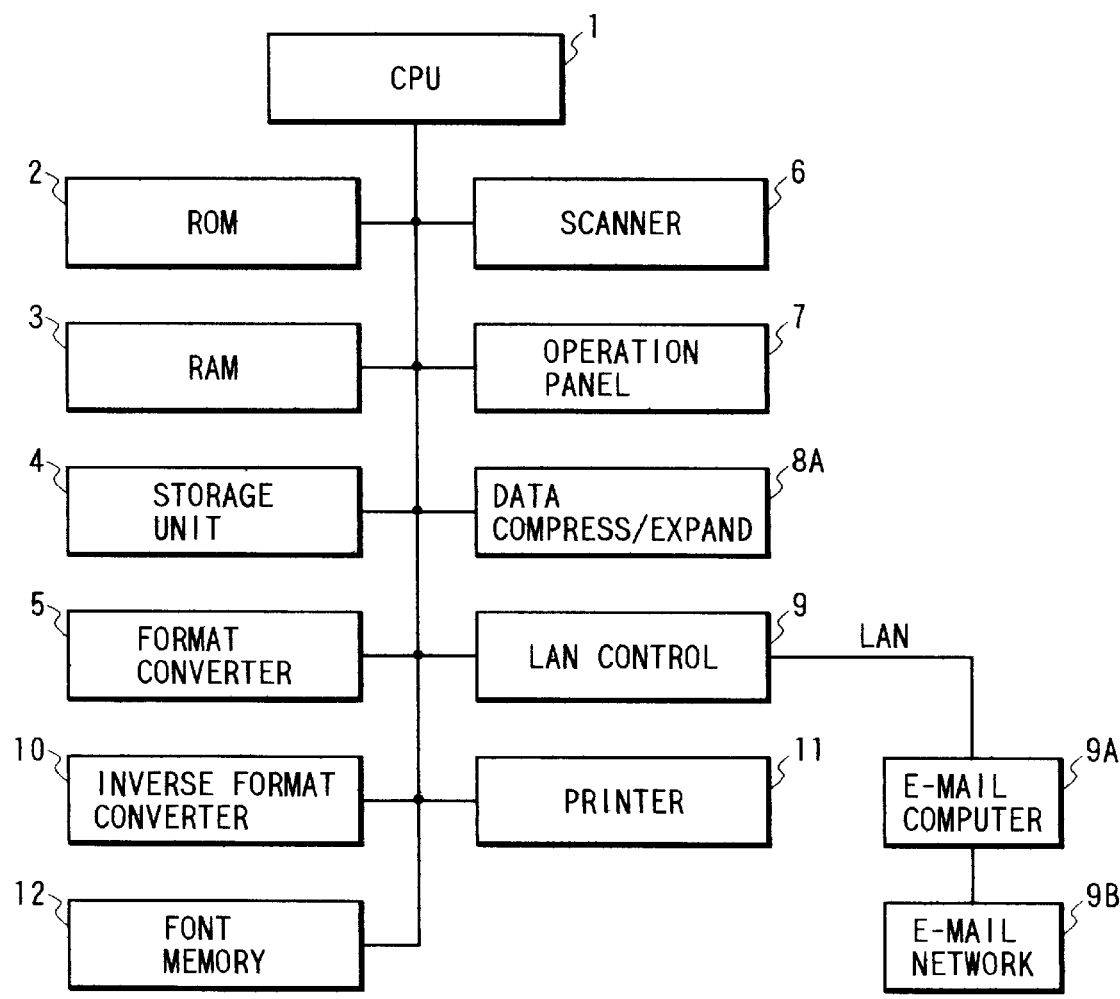
FIG. 5 is a block diagram of an electronic mail system according to a third embodiment of this invention.

FIG. 5 shows a third embodiment of this invention which is similar to the embodiment of FIGS. 3 and 4 except for an additional arrangement described hereinafter.

With reference to FIG. 5, an electronic mail system includes a CPU 1, a ROM 2, a RAM 3, a storage unit 4, a format converter 5, a scanner 6, an operation panel 7, a data compressor/expander 8A, a LAN (local area network) controller 9, an inverse format converter 10, a printer 11, and a font memory 12 which are electrically connected via a bus line. The font memory 12 includes, for example, a ROM which stores font data providing the relation between character code data and image data.

Figure 6:
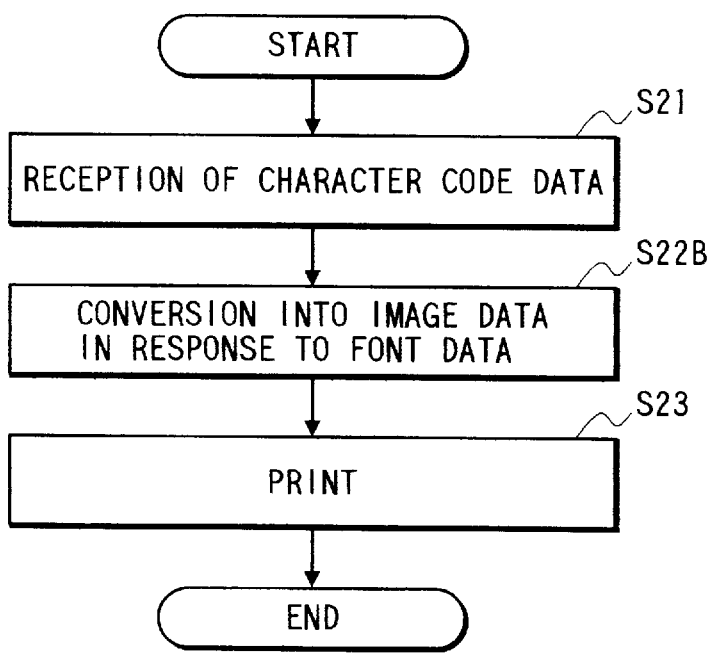
FIG. 6 is a flowchart of a segment of a program for controlling a CPU in FIG. 5.

The CPU 1 operates in accordance with a program stored in the ROM 2. FIG. 6 is a flowchart of a segment of the program. With reference to FIG. 6, a first step S21 in the program segment decides whether or not data of the e-mail format has been received by the LAN controller 9. This decision is to wait the reception of data of the e-mail format. In the case where data of the e-mail format has been received, the step S21 decides whether or not the received data of the e-mail format agrees with character code data by referring to the data format information in the header of the received data of the e-mail format. According to the MIME standards, the data format information follows the information "content-type", and denotes "text/plain" in the case where the related data of the e-mail format agrees with character code data. It should be noted that the data format information denotes "image/tiff" in the case where the related data of the e-mail format agrees with image data. When the received data of the e-mail format agrees with character code data, the program advances from the step S21 to a step S22B. When the received data of the e-mail format agrees with image data, the received data of the e-mail format will be processed as in the embodiment of FIGS. 3 and 4.

The step S22B activates the font memory 12 so that the character code data is converted into corresponding image data according to the font data in the font memory 12.

A step S23 following the step S22B transfers the image data to the printer 1 1. Also, the step S23 activates the printer 11 so that the image data is visualized or printed out by the device 11. After the step S23, the current execution cycle of the program segment ends.

Fourth Embodiment

Figure 7:
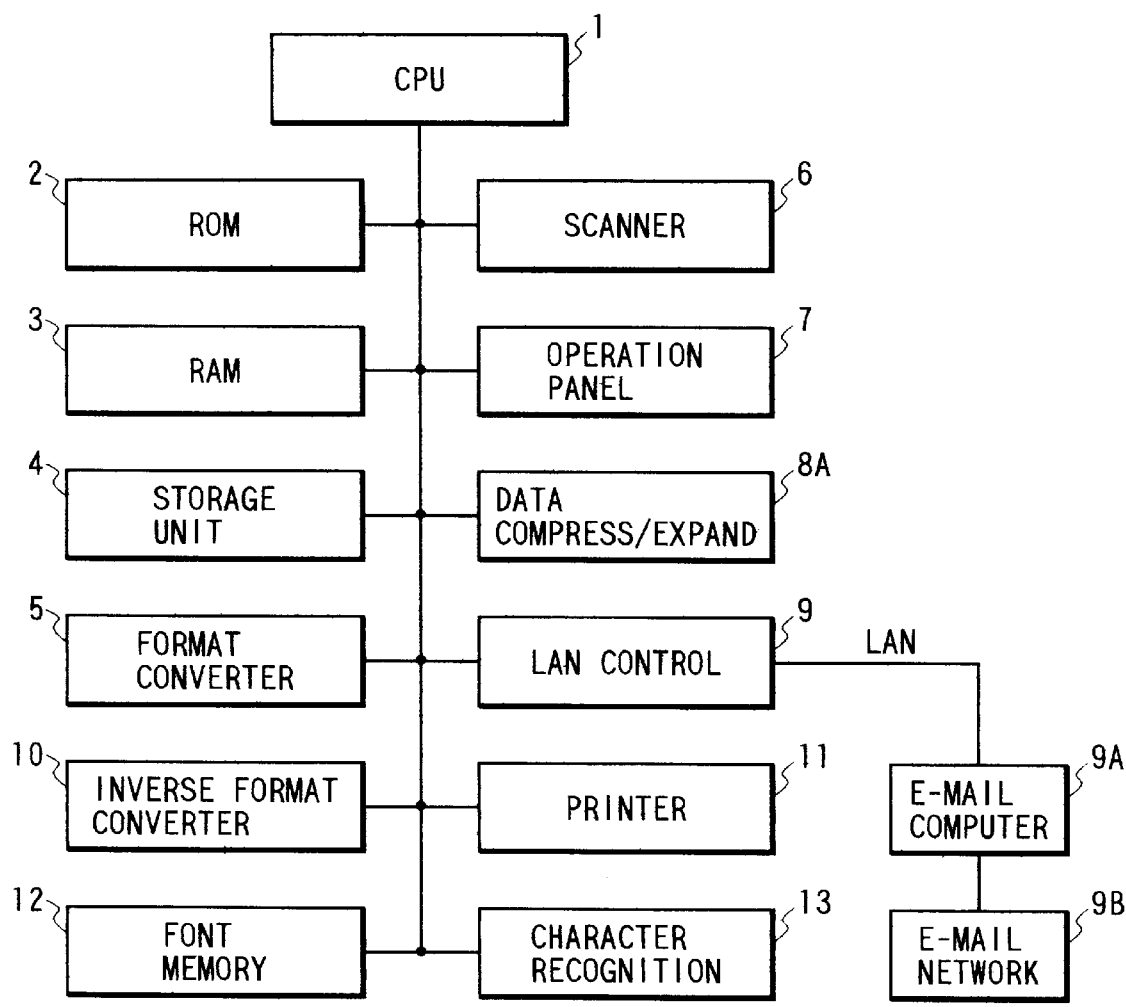
FIG. 7 is a block diagram of an electronic mail system according to a fourth embodiment of this invention.

FIG. 7 shows a fourth embodiment of this invention which is similar to the embodiment of FIGS. 5 and 6 except for an additional arrangement described hereinafter.

With reference to FIG. 7, an electronic mail system includes a CPU 1, a ROM 2, a RAM 3, a storage unit 4, a format converter 5, a scanner 6, an operation panel 7, a data compressor/expander 8A, a LAN (local area network) controller 9, an inverse format converter 10, a printer 11, a font memory 12, and a character recognition unit 13 which are electrically connected via a bus line. The character recognition unit 13 serves to recognize characters represented by binary image data (bi-level image data).

Information on a document sheet which is to be transmitted contains information of the destination or the address of a transmitted e-mail. Specifically, characters in a predetermined zone of the document sheet indicate an e-mail destination. Thus, the characters in the predetermined zone of the document sheet correspond to the information of the e-mail destination.

Figure 8:
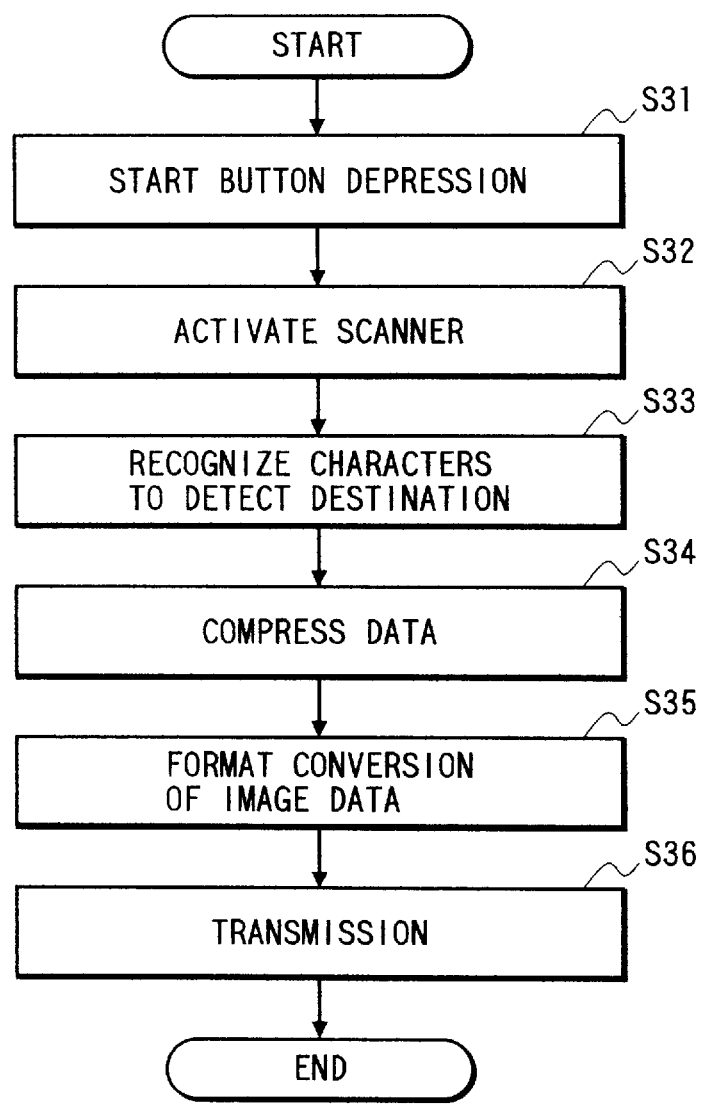
FIG. 8 is a flowchart of a segment of a program for controlling a CPU in FIG. 7.

The CPU 1 operates in accordance with a program stored in the ROM 2. FIG. 8 is a flowchart of a segment of the program. With reference to FIG. 8, a first step S31 in the program segment decides whether or not a start button on the operation panel 7 has been depressed. In the case where the start button on the operation panel 7 has been depressed, the program advances from the step S31 to a step S32. Otherwise, the program repeats the step S31. Thus, the step S31 waits the depression of the start button.

The step S32 activates the scanner 6 so that an image of the surface of a document sheet in the scanner 6 is converted by the scanner 6 into corresponding binary image data (corresponding bilevel image data).

A step S33 following the step S32 extracts a portion of the binary image data which corresponds to the predetermined zone.

The step S33 transfers the extracted portion of the image data to the character recognition unit 13. Further, the step S33 activates the character recognition unit 13 so that characters represented by the extracted portion of the image data are recognized by the device 13. The character recognition unit 13 generates information of a destination in accordance with the result of the character recognition.

A step S34 subsequent to the step S33 transfers the binary image data from the scanner 6 to the data compressor/expander 8A. Then, the step S34 activates the data compressor/expander 8A so that the binary image data is compressed by the device 8A into compression-resultant image data of a given facsimile format. Further, the step S34 transfers the compression-resultant image data of the facsimile format from the data compressor/expander 8A to the storage unit 4 before storing the compression-resultant image data of the facsimile format into the storage unit 4.

A step S35 following the step S34 transfers the compression-resultant image data of the facsimile format from the storage unit 4 to the format converter 5. In addition, the step S35 transfers the information of the destination to the format converter 5. The step S35 activates the format converter 5 so that the compression-resultant image data of the facsimile format is converted by the device 5 into corresponding image data of the e-mail format. The image data of the e-mail format contains the information of the destination. Further, the step S35 transfers the image data of the e5 mail format from the format converter 5 to the storage unit 4 before storing the image data of the e-mail format into the storage unit 4.

A step S36 subsequent to the step S35 transfers the image data of the e-mail format from the storage unit 4 to the LAN controller 9. The step S36 activates the LAN controller 9 so that the image data of the e-mail format is further transferred from the LAN controller 9 to an e-mail computer 9A. The image data of the e-mail format, that is, an e-mail, is transmitted from the e-mail computer 9A to the destination via an e-mail network 9B. After the step S36, the current execution cycle of the program segment ends.

Fifth Embodiment

Figure 9:
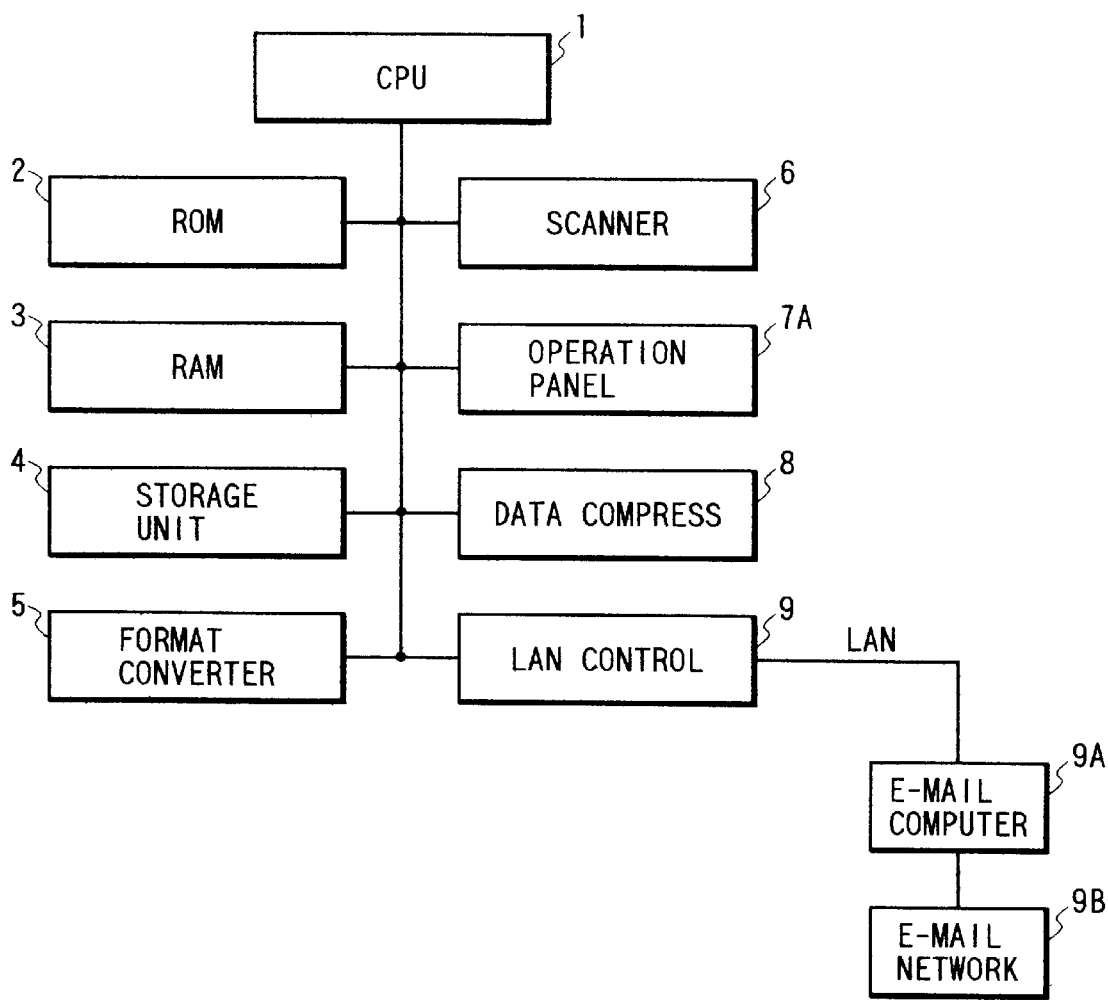
FIG. 9 is a block diagram of an electronic mail system according to a fifth embodiment of this invention.

FIG. 9 shows a fifth embodiment of this invention which is similar to the embodiment of FIGS. 1 and 2 except for an additional arrangement described hereinafter.

With reference to FIG. 9, an electronic mail system includes a CPU 1, a ROM 2, a RAM 3, a storage unit 4, a format converter 5, a scanner 6, an operation panel 7A, a data compressor 8, and a LAN (local area network) controller 9 which are electrically connected via a bus line. The operation panel 7A replaces the operation panel 7 in FIG. 1. The operation panel 7A has a key board, a start button, a source button, and other buttons. Information of the destination or the address of an e-mail to be transmitted can be inputted into the electronic mail system by operating the key board on the operation panel 7A. The scanner 6 can be activated by operating the start button on the operation panel 7A. Information of the address of an e-mail transmission source can be inputted into the electronic mail system by operating the source button on the operation panel 7A. The source address agrees with an address assigned to an e-mail computer 9A connected to the LAN controller 9. Accordingly, in the event that the transmission of an e-mail from the electronic mail system to the destination has failed, a responsive e-mail representing the transmission failure can be received by the e-mail computer 9A.

Figure 10:
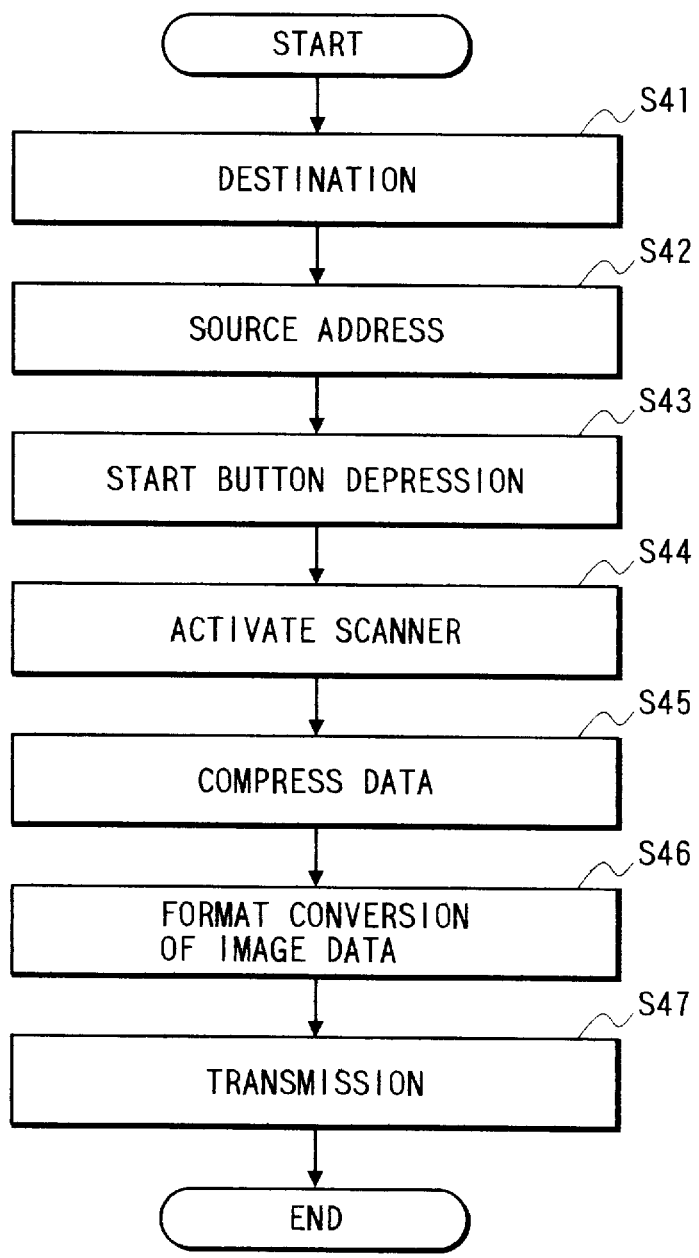
FIG. 10 is a flowchart of a segment of a program for controlling a CPU in FIG. 9.

The CPU 1 operates in accordance with a program stored in the ROM 2. FIG. 10 is a flowchart of a segment of the program. With reference to FIG. 10, a first step S41 in the program segment decides whether or not information of the destination or the address of an e-mail to be transmitted has been inputted via the operation panel 7A. In the case where the information of the destination of an e-mail to be transmitted has been inputted, the program advances from the step S41 to a step S42. Otherwise, the program repeats the step S41. Thus, the step S41 waits the reception of the information of an e-mail destination.

The step S42 decides whether or not the source button on the operation panel 7A has been depressed to input the information of the address of the e-mail transmission source. In the case where the source button on the operation panel 7A has been depressed, the program advances from the step S42 to a step S43. Otherwise, the program repeats the step S42. Thus, the step S42 waits the reception of the information of an e-mail source address.

The step S43 decides whether or not the start button on the operation panel 7A has been depressed. In the case where the start button on the operation panel 7A has been depressed, the program advances from the step S43 to a step S44. Otherwise, the program repeats the step S43. Thus, the step S43 waits the depression of the start button.

The step S44 activates the scanner 6 so that an image of the surface of a document sheet in the scanner 6 is converted by the scanner 6 into corresponding binary image data (corresponding bi-level image data). A step S45 following the step S44 transfers the binary image data from the scanner 6 to the data compressor 8. Then, the step S45 activates the data compressor 8 so that the binary image data is compressed by the device 8 into compression-resultant image data of a given facsimile format. Further, the step S45 transfers the compression-resultant image data of the facsimile format from the data compressor 8 to the storage unit 4 before storing the compression-resultant image data of the facsimile format into the storage unit 4.

A step S46 following the step S45 transfers the compression-resultant image data of the facsimile format from the storage unit 4 to the format converter 5. In addition, the step S46 transfers the information of the source address and the information of the destination to the format converter 5. The step S46 activates the format converter 5 so that the compression-resultant image data of the facsimile format is converted by the device 5 into corresponding image data of the e-mail format. The image data of the e-mail format contains the information of the source address and the information of the destination. Further, the step S46 transfers the image data of the e-mail format from the format converter 5 to the storage unit 4 before storing the image data of the e-mail format into the storage unit 4.

A step S47 subsequent to the step S46 transfers the image data of the e-mail format from the storage unit 4 to the LAN controller 9. The step S47 activates the LAN controller 9 so that the image data of the e-mail format is further transferred from the LAN controller 9 to the e-mail computer 9A. The image data of the e-mail format, that is, an e-mail, is transmitted from the e-mail computer 9A to the destination via an e-mail network 9B. After the step S47, the current execution cycle of the program segment ends.

Sixth Embodiment

Figure 11:
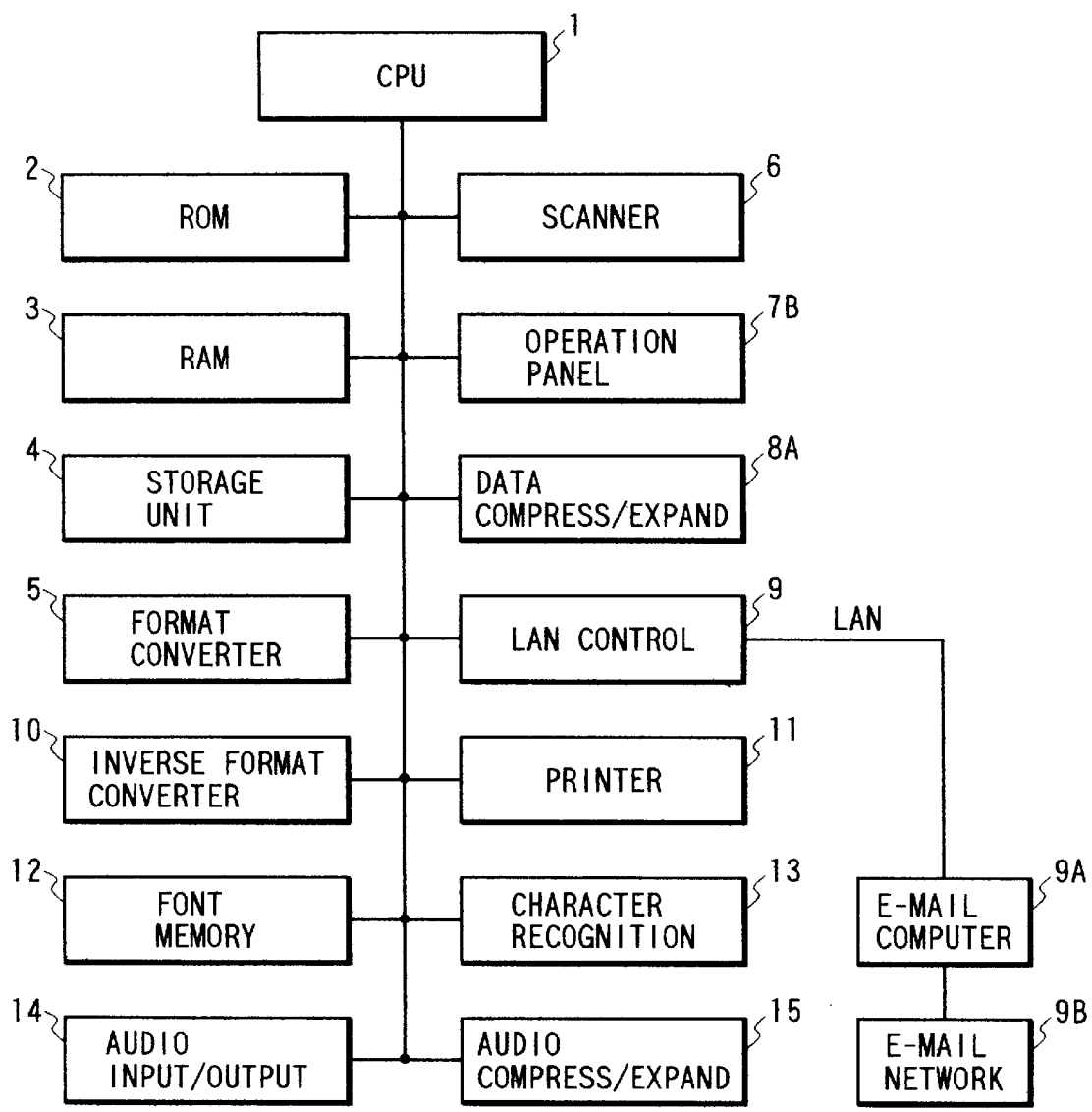
FIG. 11 is a block diagram of an electronic mail system according to a sixth embodiment of this invention.

FIG. 11 shows a sixth embodiment of this invention which is similar to the embodiment of FIGS. 7 and 8 except for an additional arrangement described hereinafter.

With reference to FIG. 11, an electronic mail system includes a CPU 1, a ROM 2, a RAM 3, a storage unit 4, a format converter 5, a scanner 6, an operation panel 7B, a data compressor/expander 8A, a LAN (local area network) controller 9, an inverse format converter 10, a printer 11, a font memory 12, a character recognition unit 13, an audio input/output device 14, and an audio compressor/expander 15 which are electrically connected via a bus line. The operation panel 7B replaces the operation panel 7 in FIG. 7. The operation panel 7B has a start button, a message button, and other buttons. The scanner 6 can be activated by operating the start button on the operation panel 7B. The depression of the message button on the operation panel 7B enables audio message information to be inputted into the electronic mail system. The audio input/output device 14 includes a microphone and an electric-to-sound transducer such as a loudspeaker (a sound speaker). The microphone in the audio input/output device 14 converts a sound message into a corresponding audio signal. The audio signal is changed into corresponding audio data by an A/D converter in the audio input/output device 14. The audio input/output device 14 also includes a D/A converter which changes audio data into a corresponding audio signal. The audio signal is converted into corresponding sound by the loudspeaker (the sound speaker) in the audio input/output device 14. The audio compressor/expander 15 serves to compress and expand audio data.

Figure 12:
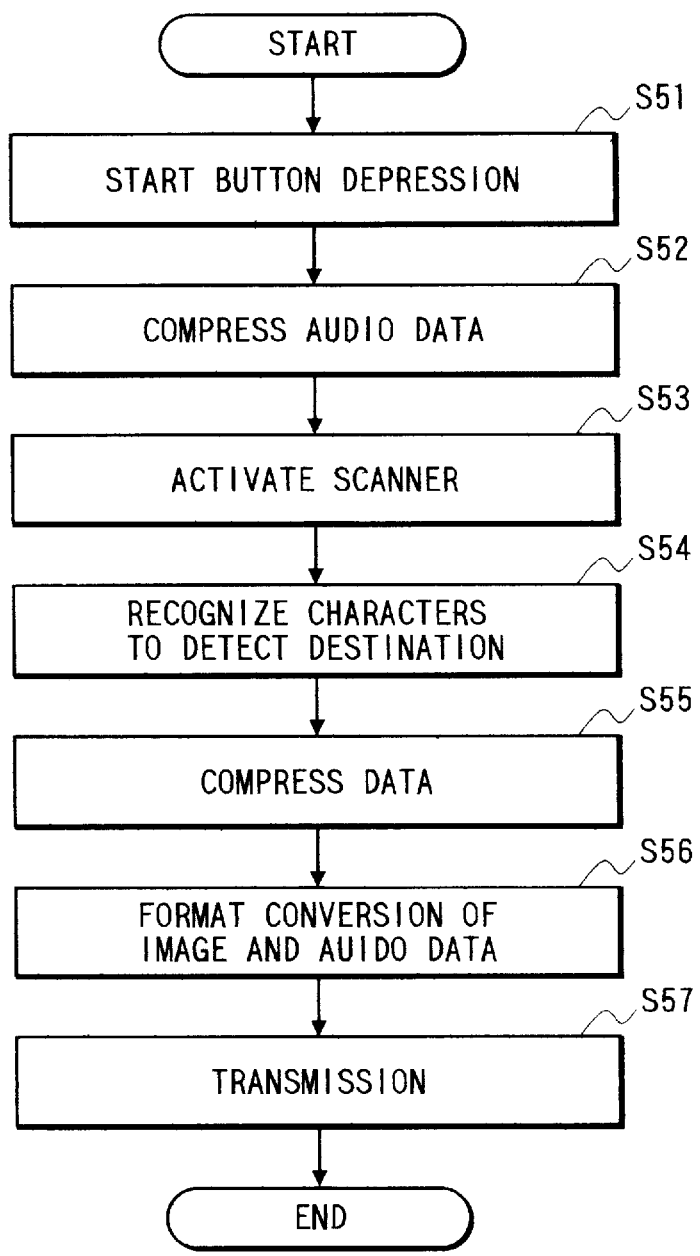
FIG. 12 is a flowchart of a first segment of a program for controlling a CPU in FIG. 11.

The CPU 1 operates in accordance with a program stored in the ROM 2. FIG. 12 is a flowchart of a first segment of the program. With reference to FIG. 12, a first step S51 in the first program segment decides whether or not the start button on the operation panel 7B has been depressed. In the case where the start button on the operation panel 7B has been depressed, the program advances from the step S51 to a step S52. Otherwise, the program repeats the step S51. Thus, the step S51 waits the depression of the start button.

The step S52 decides whether or not the message button on the operation panel 7B is depressed and a sound message is converted by the microphone and the A/D converter in the audio input/output device 14 into corresponding audio data. This decision is to wait the depression of the message button and the reception of the audio data. In the case where the message button on the operation panel 7B is depressed and the sound message is converted by the audio input/output device 14 into the corresponding audio data, the step S52 transfers the audio data from the audio input/output device 14 to the audio compressor/expander 15. The step S52 activates the audio compressor/expander 15 so that the audio data is compressed by the device 15 into compression-resultant audio data. Further, the step S52 transfers the compression-resultant audio data from the audio compressor/expander 15 to the storage unit 4 before storing the compression-resultant audio data into the storage unit 4.

A step S53 subsequent to the step S52 activates the scanner 6 so that an image of the surface of a document sheet in the scanner 6 is converted by the scanner 6 into corresponding binary image data (corresponding bi-level image data).

A step S54 following the step S53 extracts a portion of the binary image data which corresponds to a predetermined zone. The step S54 transfers the extracted portion of the image data to the character recognition unit 13. Further, the step S54 activates the character recognition unit 13 so that characters represented by the extracted portion of the image data are recognized by the device 13.

The character recognition unit 13 generates information of a destination in accordance with the result of the character recognition.

A step S55 subsequent to the step S54 transfers the binary image data from the scanner 6 to the data compressor/expander 8A. Then, the step S55 activates the data compressor/expander 8A so that the binary image data is compressed by the device 8A into compression-resultant image data of a given facsimile format. Further, the step S55 transfers the compression-resultant image data of the facsimile format from the data compressor/expander 8A to the storage unit 4 before storing the compression-resultant image data of the facsimile format into the storage unit 4.

A step S56 following the step S55 transfers the compression-resultant image data of the facsimile format from the storage unit 4 to the format converter 5. In addition, the step S56 transfers the information of the destination to the format converter 5. Further, the step S56 transmits the compression-resultant audio data from the storage unit 4 to the format converter 5. The step S56 activates the format converter 5 so that the compression-resultant image data of the facsimile format and the compression-resultant audio data are converted and integrated by the device 5 into corresponding image/audio data of the e-mail format. It should be noted that the manner of the integration is in conformity with the MIME standards. The image/audio data of the e-mail format contains the information of the destination. Further, the step S56 transfers the image/audio data of the e-mail format from the format converter 5 to the storage unit 4 before storing the image/audio data of the e-mail format into the storage unit 4.

A step S57 subsequent to the step S56 transfers the image/audio data of the e-mail format from the storage unit 4 to the LAN controller 9. The step S57 activates the LAN controller 9 so that the image/audio data of the e-mail format is further transferred from the LAN controller 9 to an e-mail computer 9A. The image/audio data of the e-mail format, that is, an e-mail, is transmitted from the e-mail computer 9A to the destination via an e-mail network 9B. After the step S57, the current execution cycle of the first program segment ends.

Figure 13:
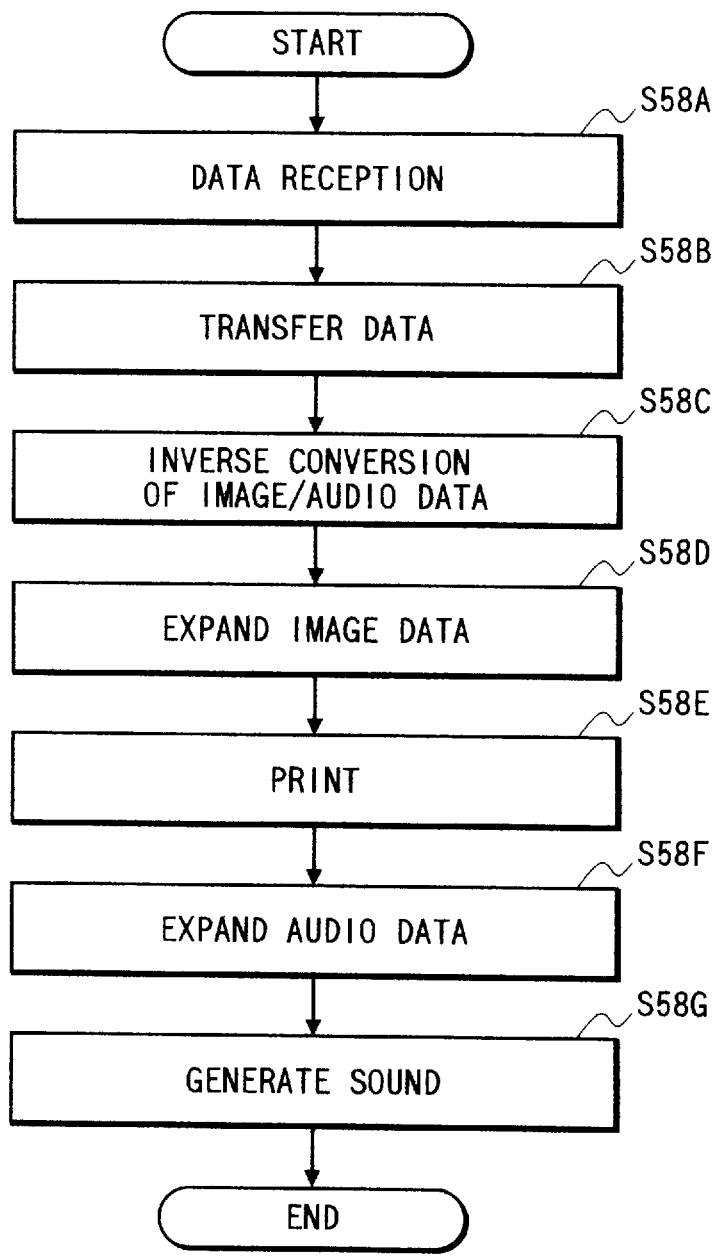
FIG. 13 is a flowchart of a second segment of the program for controlling the CPU in FIG. 11.

FIG. 13 is a flowchart of a second segment of the program. With reference to FIG. 13, a first step S58A in the second program segment decides whether or not data of the e-mail format has been received by the LAN controller 9. This decision is to wait the reception of data of the e-mail format. In the case where data of the e-mail format has been received, the step S58A transfers the received data of the e-mail format to the storage unit 4. The step S58A controls the storage unit 4 so that the received data of the e-mail format is stored into the storage unit 4.

A step S58B following the step S58A transfers the received data of the e-mail format from the storage unit 4 to the inverse format converter 10. A step S58C subsequent to the step S58B decides whether or not the received data of the e-mail format agrees with image/audio data of the e-mail format by referring to related information in the header of the received data of the e-mail format. When the received data agrees with image/audio data, the step S58C activates the inverse format converter 10 so that the received data of the e-mail format is converted and separated by the device 10 into image data of a given facsimile format and audio data. When the received data differs from image/audio data, the received data will be processed as in the embodiment of FIGS. 3 and 4.

A step S58D following the step S58C transfers the image data of the facsimile format from the inverse format converter 10 to the data compressor/expander 8A. The step S58D activates the data compressor/expander 8A so that the image data of the facsimile format is expanded by the device 8A into expansion-resultant binary image data (expansion-resultant bi-level image data). Further, the step S58D transfers the expansion-resultant binary image data from the data compressor/expander 8A to the storage unit 4 before storing the expansion-resultant binary image data into the storage unit 4.

A step S58E subsequent to the step S58D transfers the expansion-resultant binary image data from the storage unit 4 to the printer 11. The step S58E activates the printer 11 so that the expansion-resultant binary image data is visualized or printed out by the device 11.

A step S58F following the step S58E transfers the audio data from the inverse format converter 10 to the audio compressor/expander 15. The step S58F activates the audio compressor/expander 15 so that the audio data is expanded by the device 15 into expansion-resultant audio data. Further, the step S58F transfers the expansion-resultant audio data from the audio compressor/expander 15 to the storage unit 4 before storing the expansion-resultant audio data into the storage unit 4.

A step S58G subsequent to the step S58F transfers the expansion-resultant audio data from the storage unit 4 to the audio input/output device 14. The step S58G activates the audio input/output device 14 so that the loudspeaker (the sound speaker) and the D/A converter therein generate sound in response to the audio data. After the step S58G, the current execution cycle of the second program segment ends.

Seventh Embodiment

Figure 14:
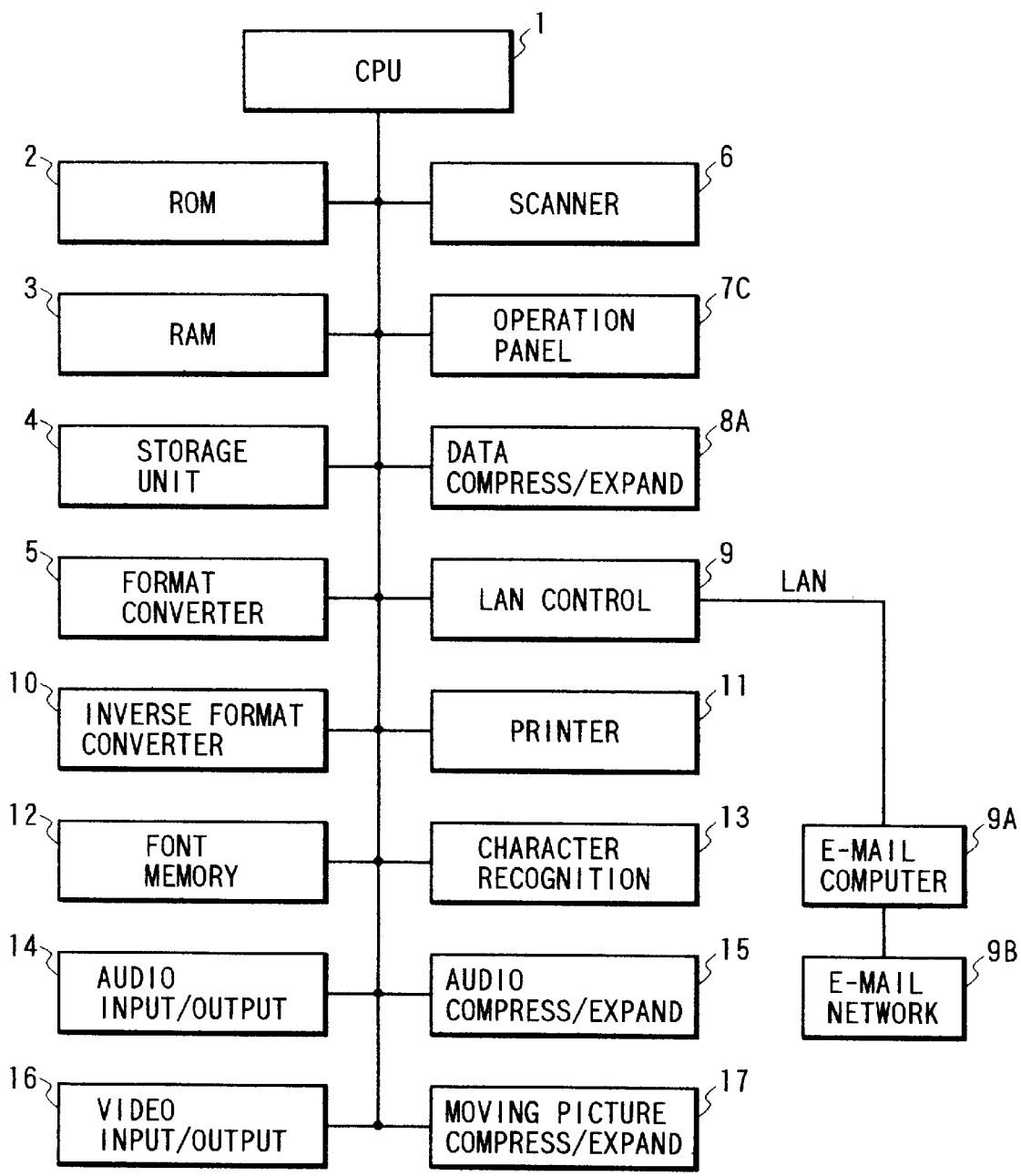
FIG. 14 is a block diagram of an electronic mail system according to a seventh embodiment of this invention.

FIG. 14 shows a seventh embodiment of this invention which is similar to the embodiment of FIGS. 11–13 except for an additional arrangement described hereinafter.

With reference to FIG. 14, an electronic mail system includes a CPU 1, a ROM 2, a RAM 3, a storage unit 4, a format converter 5, a scanner 6, an operation panel 7C, a data compressor/expander 8A, a LAN (local area network) controller 9, an inverse format converter 10, a printer 11, a font memory 12, a character recognition unit 13, an audio input/output device 14, an audio compressor/expander 15, a video input/output device 16, and a moving-picture compressor/expander 17 which are electrically connected via a bus line. The operation panel 7C replaces the operation panel 7B in FIG. 11. The operation panel 7C has a start button, a video button, and other buttons. The scanner 6 can be activated by operating the start button on the operation panel 7C. The depression of the video button on the operation panel 7C enables moving-picture information to be inputted into the electronic mail system. The video input/output device 16 includes a video camera and a display such as a CRT. The video camera in the video input/output device 16 converts moving pictures into corresponding data. The display in the video input/output device 16 visualizes moving-picture data. The moving-picture compressor/expander 17 serves to compress and expand moving-picture data.

Figure 15:
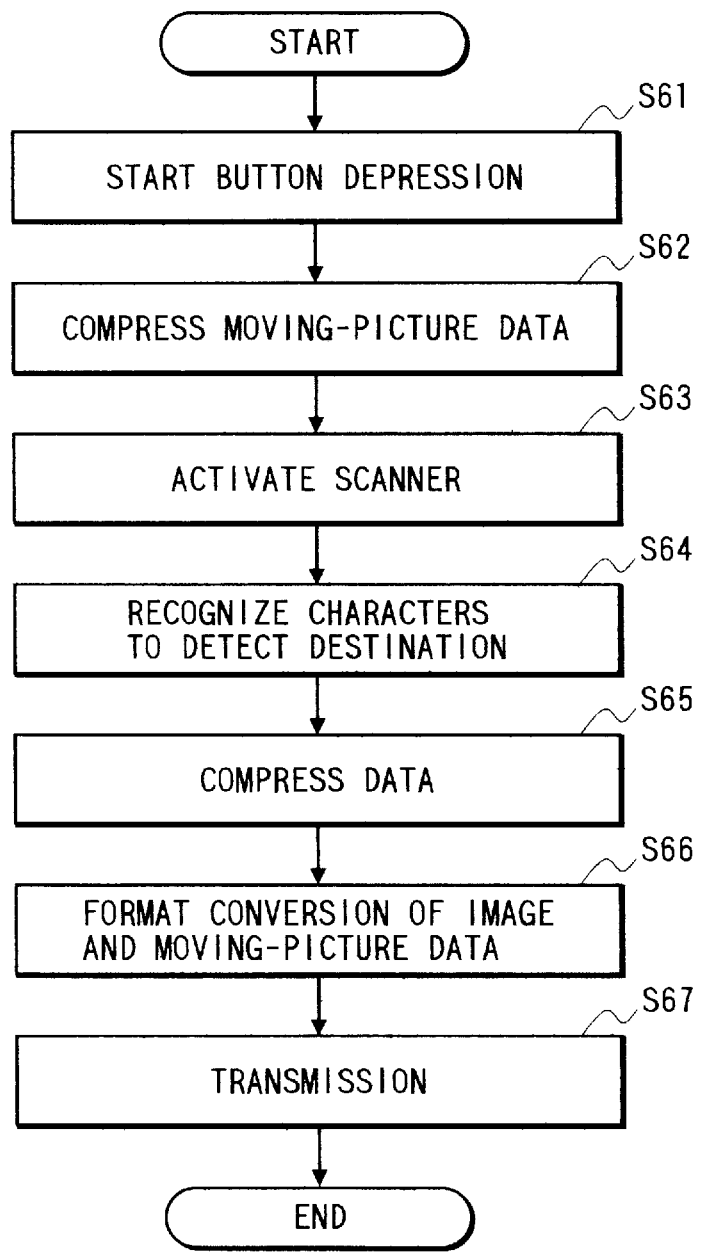
FIG. 15 is a flowchart of a segment of a program for controlling a CPU in FIG. 14.

The CPU 1 operates in accordance with a program stored in the ROM 2. FIG. 15 is a flowchart of a segment of the program. With reference to FIG. 15, a first step S61 in the program segment decides whether or not the start button on the operation panel 7C has been depressed. In the case where the start button on the operation panel 7C has been depressed, the program advances from the step S61 to a step S62. Otherwise, the program repeats the step S61. Thus, the step S61 waits the depression of the start button.

The step S62 decides whether or not the video button on the operation panel 7C is depressed and moving pictures are converted by the video camera in the video input/output device 16 into corresponding data. This decision is to wait the depression of the video button and the reception of moving-picture data. In the case where the video button on the operation panel 7C is depressed and the moving pictures are converted by the video camera in the video input/output device 16 into the corresponding data, the step S62 transfers the moving-picture data from the video input/output device 16 to the moving-picture compressor/expander 17. The step S62 activates the moving-picture compressor/expander 17 so that the moving-picture data is compressed by the device 17 into compression-resultant moving-picture data. Further, the step S62 transfers the compression-resultant moving-picture data from the moving-picture compressor/expander 17 to the storage unit 4 before storing the compression-resultant moving-picture data into the storage unit 4.

A step S63 subsequent to the step S62 activates the scanner 6 so that an image of the surface of a document sheet in the scanner 6 is converted by the scanner 6 into corresponding binary image data (corresponding bi-level image data).

A step S64 following the step S63 extracts a portion of the binary image data which corresponds to a predetermined zone. The step S64 transfers the extracted portion of the image data to the character recognition unit 13. Further, the step S64 activates the character recognition unit 13 so that characters represented by the extracted portion of the image data are recognized by the device 13. The character recognition unit 13 generates information of a destination in accordance with the result of the character recognition.

A step S65 subsequent to the step S64 transfers the binary image data from the scanner 6 to the data compressor/expander 8A. Then, the step S65 activates the data compressor/expander 8A so that the binary image data is compressed by the device 8A into compression-resultant image data of a given facsimile format. Further, the step S65 transfers the compression-resultant image data of the facsimile format from the data compressor/expander 8A to the storage unit 4 before storing the compression-resultant image data of the facsimile format into the storage unit 4.

A step S66 following the step S65 transfers the compression-resultant image data of the facsimile format from the storage unit 4 to the format converter 5. In addition, the step S66 transfers the information of the destination to the format converter 5. Further, the step S66 transmits the compression-resultant moving-picture data from the storage unit 4 to the format converter 5. The step S66 activates the format converter 5 so that the compression-resultant image data of the facsimile format and the compression-resultant moving-picture data are converted and integrated by the device 5 into corresponding image data of the e-mail format. It should be noted that the manner of the integration is in conformity with the MIME standards. The image data of the e-mail format contains the information of the destination. Further, the step S66 transfers the image data of the e-mail format from the format converter 5 to the storage unit 4 before storing the image data of the e-mail format into the storage unit 4.

A step S67 subsequent to the step S66 transfers the image data of the e-mail format from the storage unit 4 to the LAN controller 9. The step S67 activates the LAN controller 9 so that the image data of the e-mail format is further transferred from the LAN controller 9 to an e-mail computer 9A. The image data of the e-mail format, that is, an e-mail, is transmitted from the e-mail computer 9A to the destination via an e-mail network 9B. After the step S67, the current execution cycle of the program segment ends.

Eighth Embodiment

Figure 16:
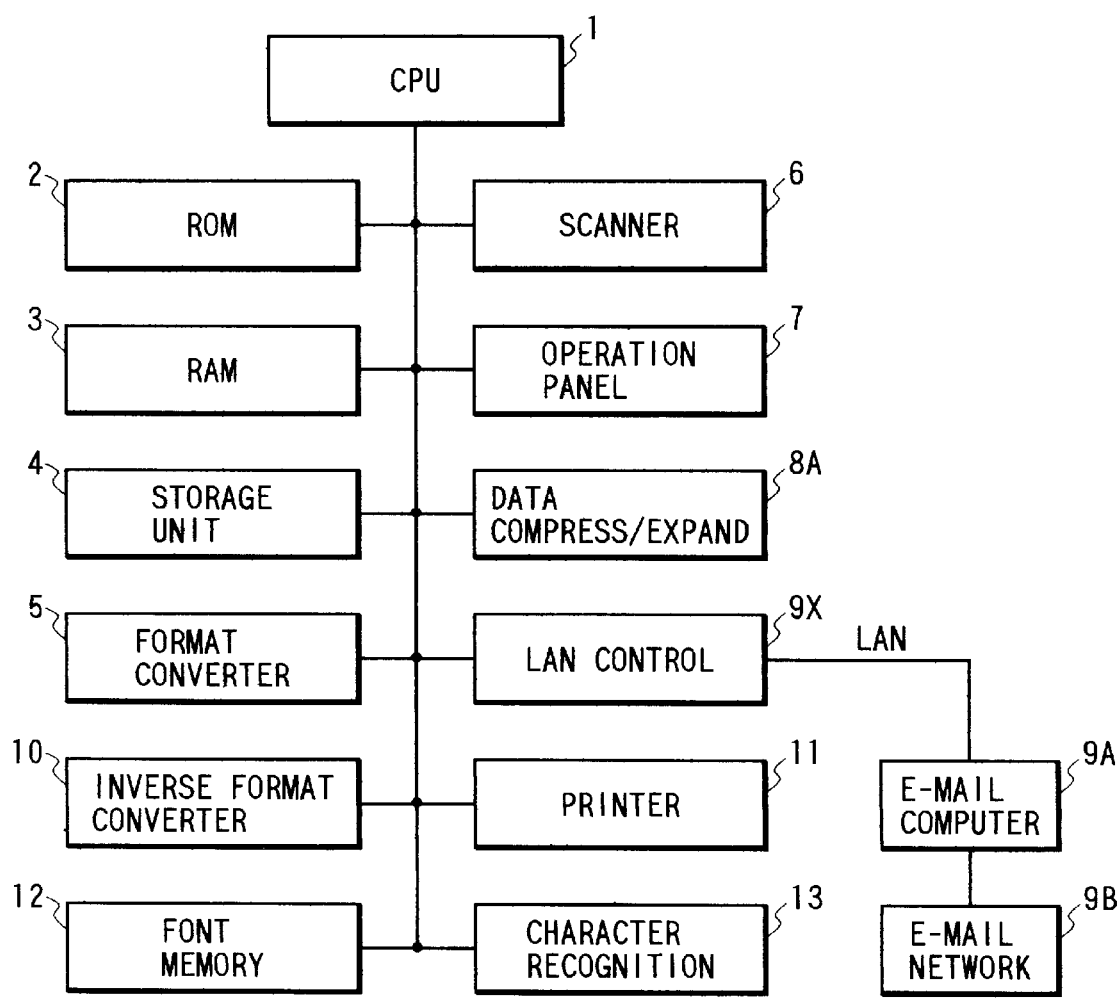
FIG. 16 is a block diagram of an electronic mail system according to an eighth embodiment of this invention.

FIG. 16 shows an eighth embodiment of this invention which is similar to the embodiment of FIGS. 7 and 8 except for design changes described hereinafter.

With reference to FIG. 16, an electronic mail system includes a CPU 1, a ROM 2, a RAM 3, a storage unit 4, a format converter 5, a scanner 6, an operation panel 7, a data compressor/expander 8A, a LAN (local area network) controller 9X, an inverse format converter 10, a printer 11, a font memory 12, and a character recognition unit 13 which are electrically connected via a bus line. The LAN controller 9X replaces the LAN controller 9 in FIG. 7. The LAN controller 9X analyzes a received e-mail. The CPU 1 is programmed to execute data processing in response to a result of the analysis by the LAN controller 9X.

FIG. 17 shows a part of an example of an e-mail in a given format. As shown in FIG. 17, the e-mail has a header 31 and a text (a message) 32. The header 31 is followed by the text 32. The header 31 contains information representing a type of data in the text 32. In the example of FIG. 17, "Content-Type: text/plain" in the header 31 represents that a related portion of the text 32 corresponds to character code data. Further, "Subject: !!$" in the header 31 represents that a related portion of the text 32 corresponds to an instruction (a command).

The text 32 contains ID (identification) information of a sender, information of a list of destination mail addresses, and information of a source address. The ID information of the sender is preceded by a specified code word "!ID". The information of the list of the destination mail addresses is preceded by a specified code word "!LIST". The information of the source address is preceded by a specified code word "!FROM".

After the LAN controller 9 receives an e-mail, the LAN controller 9 analyzes ID (identification) information of a sender, information of a list of destination mail addresses, and information of a source address which are contained in the received e-mail. The LAN controller 9 recognizes the sender as a result of the analysis of the ID information thereof. The CPU 1 serves to transfer the ID information of the sender, the information of the list of the destination mail addresses, and the information of the source address from the LAN controller 9 to the storage unit 4. Then, the CPU 1 serves to store the ID information of the sender, the information of the list of the destination mail addresses, and the information of the source address into the storage unit 4.

Ninth Embodiment

Figure 18:
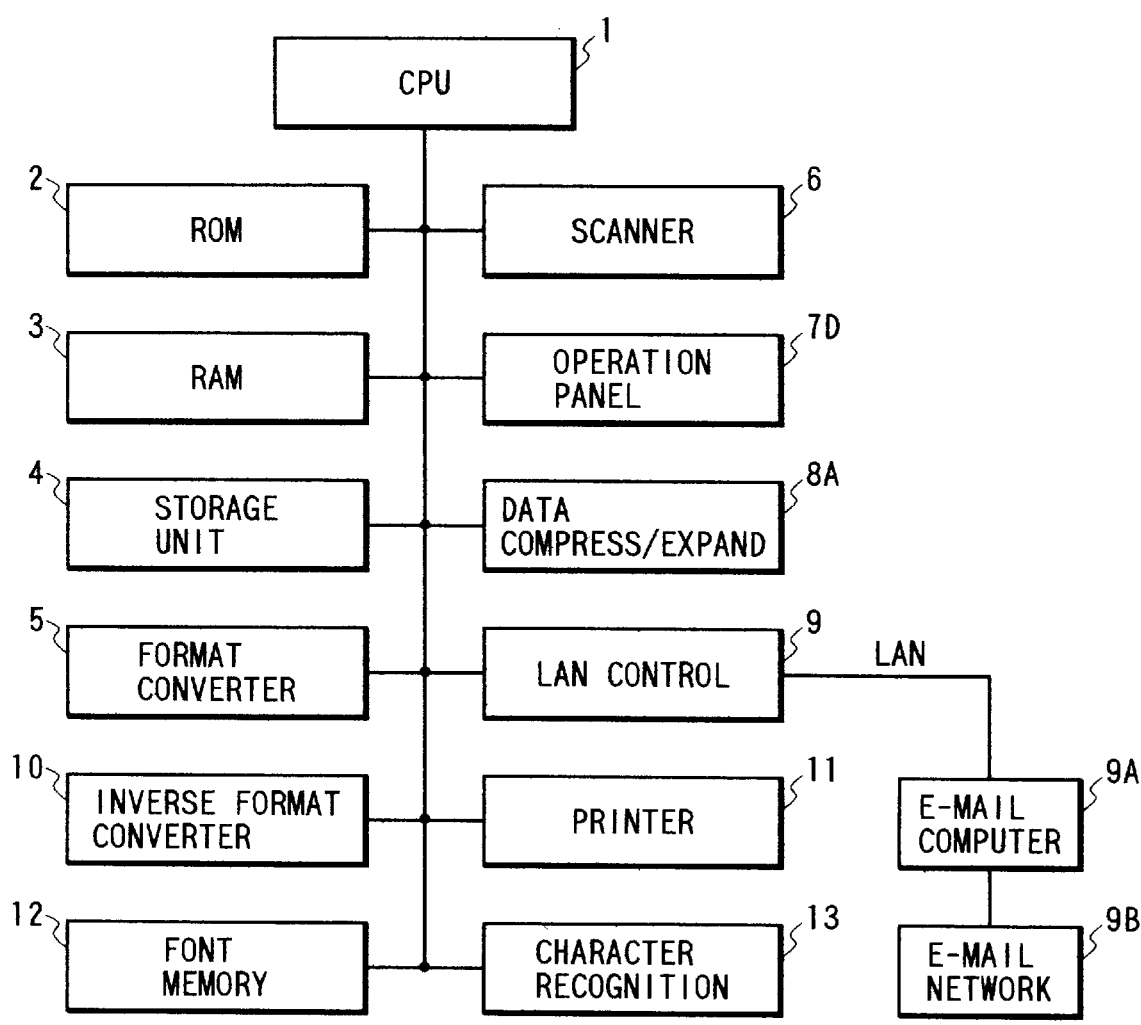
FIG. 18 is a block diagram of an electronic mail system according to a ninth embodiment of this invention.

FIG. 18 shows a ninth embodiment of this invention which is similar to the embodiment of FIGS. 7 and 8 except for design changes described hereinafter.

With reference to FIG. 18, an electronic mail system includes a CPU 1, a ROM 2, a RAM 3, a storage unit 4, a format converter 5, a scanner 6, an operation panel 7D, a data compressor/expander 8A, a LAN (local area network) controller 9, an inverse format converter 10, a printer 11, a font memory 12, and a character recognition unit 13 which are electrically connected via a bus line. The operation panel 7D replaces the operation panel 7 in FIG. 7. The operation panel 7D has a display, a key board, a start button, a destination list button, and other buttons. Information of a destination list can be visualized by the display on the operation panel 7D. ID information of a sender can be inputted into the electronic mail system by operating the key board on the operation panel 7D. The scanner 6 can be activated by operating the start button on the operation panel 7D. The depression of the destination list button on the operation panel 7D enables a destination list to be indicated by display on the operation panel 7D.

Figure 19:
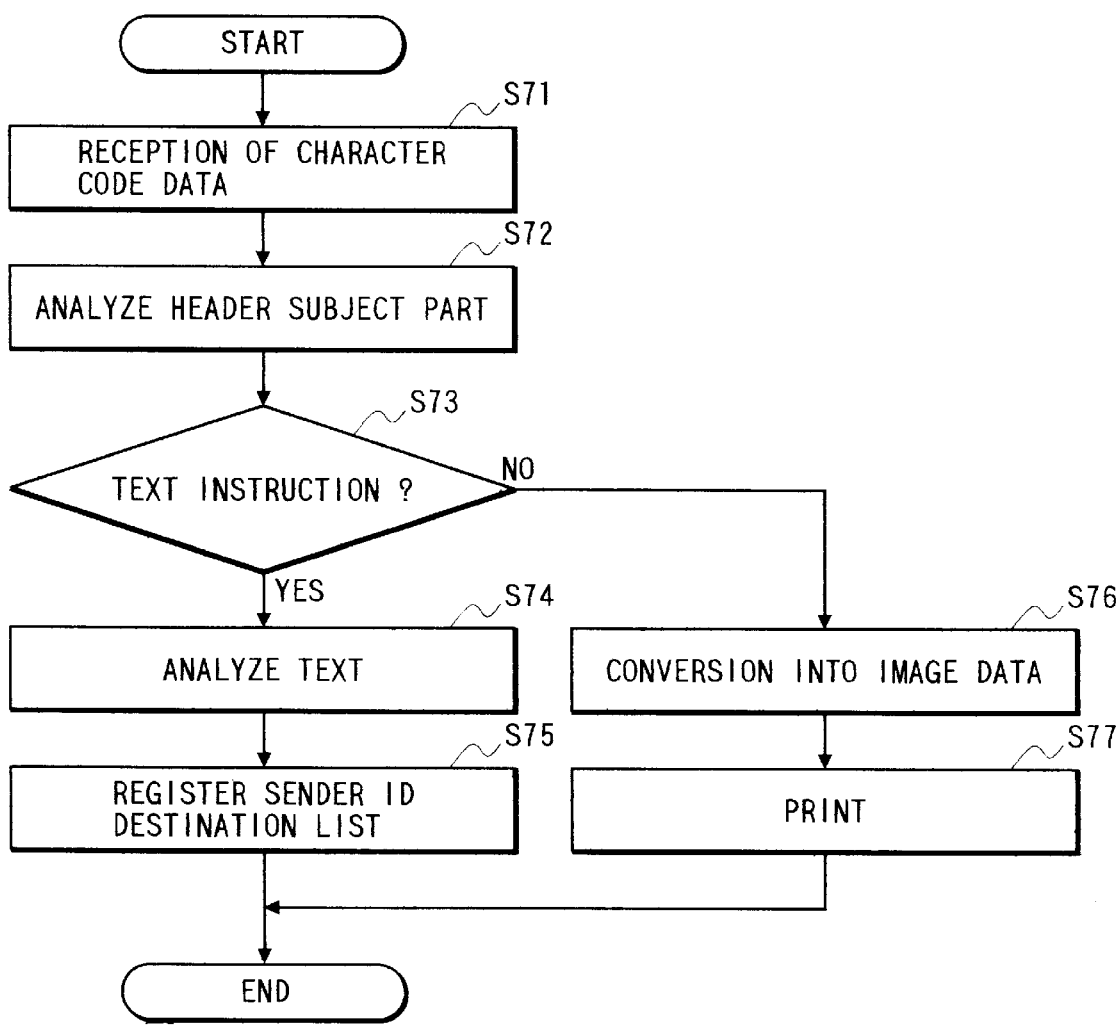
FIG. 19 is a flowchart of a first segment of a program for controlling a CPU in FIG. 18.

The CPU 1 operates in accordance with a program stored in the ROM 2. FIG. 19 is a flowchart of a first segment of the program. With reference to FIG. 19, a first step S71 in the first program segment decides whether or not character code data in an e-mail has been received by the LAN controller 9. In the case where the character code data in the e-mail has been received, the program advances from the step S71 to a step S72. Otherwise, the program repeats the step S71. Thus, the step S71 waits the reception of character code data in an e-mail. The step S72 analyzes the "Subject" part of the header of the e-mail.

A step S73 following the step S72 decides whether or not the "Subject" part of the header corresponds to a text instruction by referring to the result of the analysis by the step S72. When the "Subject" part of the header corresponds to a text instruction, the program advances from the step S73 to a step S74. Otherwise, the program advances from the step S73 to a step S76.

The step S74 analyzes the text in the e-mail to extract ID information of a sender and information of a destination mail list therefrom. A step S75 following the step S74 stores or registers the ID information of the sender and the information of the destination mail list into the storage unit 4 in a manner such that the ID information of the sender and the information of the destination mail list are in a given correspondence relation. After the step S75, the current execution cycle of the first program segment ends.

The step S76 converts character code data in the text into corresponding image data. A step S77 following the step S76 transfers the image data to the printer 11. The step S77 activates the printer 11 so that the image data is visualized or printed out by the device 11. After the step S77, the current execution cycle of the first program segment ends.

Figure 20:
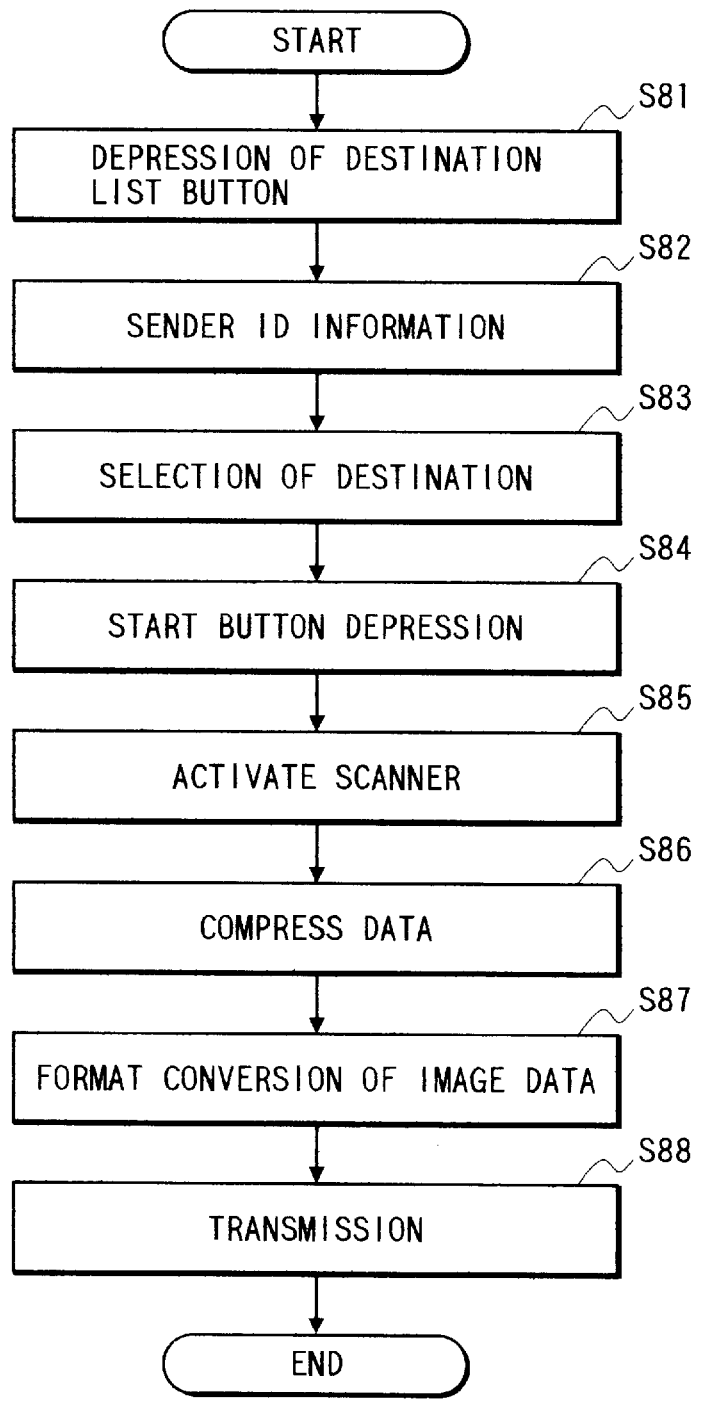
FIG. 20 is a flowchart of a second segment of the program for controlling the CPU in FIG. 18.

FIG. 20 is a flowchart of a second segment of the program. With reference to FIG. 20, a first step S81 of the second program segment decides whether or not the destination list button on the operation panel 7D has been depressed. In the case where the destination list button on the operation panel 7D has been depressed, the program advances from the step S81 to a step S82. Otherwise, the program repeats the step S81. Thus, the step S82 waits the depression of the destination list button.

The step S82 decides whether or not ID information of a sender has been inputted via the operation panel 7D. This decision is to wait the reception of sender ID information. In the case where the ID information of the sender has been inputted, the step S82 reads out information of a destination mail list from the storage unit 4 which corresponds to the ID information of the sender. The step S82 transfers the information of the destination mail list to the display on the operation panel 7D. The step S82 activates the display on the operation panel 7D so that the information of the destination mail list is visualized thereby.

A step S83 following the step S82 decides whether or not a destination has been selected from the visualized destination mail list by actuating the operation panel 7D. In the case where a destination has been selected, the program advances from the step S83 to a step S84. Otherwise, the program repeats the step S83. Thus, the step S83 waits the selection of a destination.

The step S84 decides whether or not the start button on the operation panel 7D has been depressed. In the case where the start button on the operation panel 7D has been depressed, the program advances from the step S84 to a step S85. Otherwise, the program repeats the step S84. Thus, the step S84 waits the depression of the start button.

The step S85 activates the scanner 6 so that an image of the surface of a document sheet in the scanner 6 is converted by the scanner 6 into corresponding binary image data (corresponding bi-level image data).

A step S86 subsequent to the step S85 transfers the binary image data from the scanner 6 to the data compressor/expander 8A.

Then, the step S86 activates the data compressor/expander 8A so that the binary image data is compressed by the device 8A into compression-resultant image data of a given facsimile format. Further, the step S86 transfers the compression-resultant image data of the facsimile format from the data compressor/expander 8A to the storage unit 4 before storing the compression-resultant image data of the facsimile format into the storage unit 4.

A step S87 following the step S86 transfers the compression-resultant image data of the facsimile format from the storage unit 4 to the format converter 5. In addition, the step S87 informs the format converter 5 of the selected destination. The step S87 activates the format converter 5 so that the compression-resultant image data of the facsimile format is converted by the device 5 into corresponding image data of the e-mail format. The image data of the e-mail format contains the information of the destination.

Further, the step S87 transfers the image data of the e-mail format from the format converter 5 to the storage unit 4 before storing the image data of the e-mail format into the storage unit 4.

A step S88 subsequent to the step S87 transfers the image data of the e-mail format from the storage unit 4 to the LAN controller 9. The step S88 activates the LAN controller 9 so that the image data of the e-mail format is further transferred from the LAN controller 9 to an e-mail computer 9A. The image data of the e-mail format, that is, an e-mail, is transmitted from the e-mail computer 9A to the selected destination via an e-mail network 9B. After the step S88, the current execution cycle of the second program segment ends.

Tenth Embodiment

Figure 21:
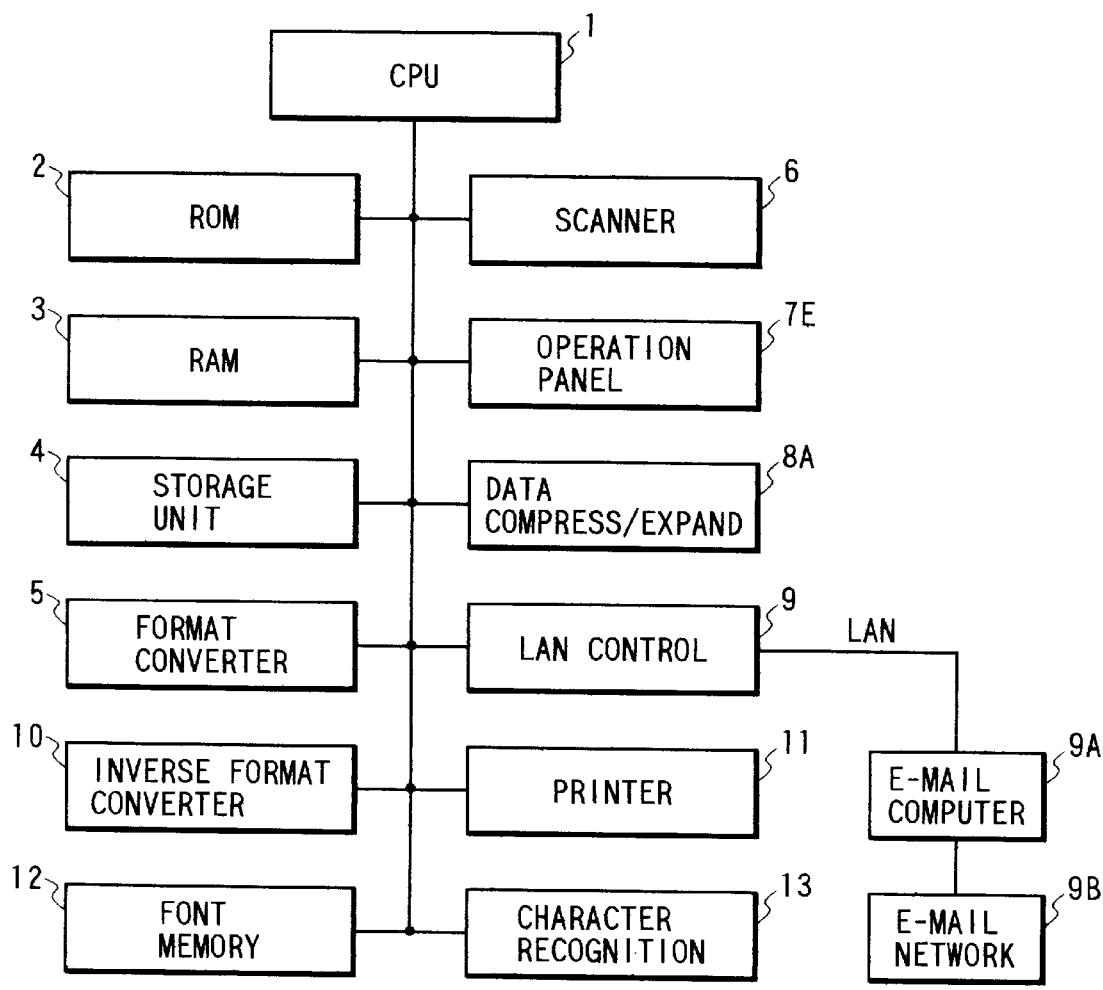
FIG. 21 is a block diagram of an electronic mail system according to a tenth embodiment of this invention.

FIG. 21 shows a tenth embodiment of this invention which is similar to the embodiment of FIGS. 18–20 except for design changes described hereinafter.

With reference to FIG. 21, an electronic mail system includes a CPU 1, a ROM 2, a RAM 3, a storage unit 4, a format converter 5, a scanner 6, an operation panel 7E, a data compressor/expander 8A, a LAN (local area network) controller 9, an inverse format converter 10, a printer 11, a font memory 12, and a character recognition unit 13 which are electrically connected via a bus line. The operation panel 7E replaces the operation panel 7D in FIG. 18. The operation panel 7E has a display, a key board, a start button, a source button, and other buttons. Information of a source address can be visualized by the display on the operation panel 7E. Information of the destination or the address of an e-mail to be transmitted can be inputted into the electronic mail system by operating the key board on the operation panel 7E. ID information of a sender can be inputted into the electronic mail system by operating the source button on the operation panel 7E. The scanner 6 can be activated by operating the start button on the operation panel 7E.

Figure 22:
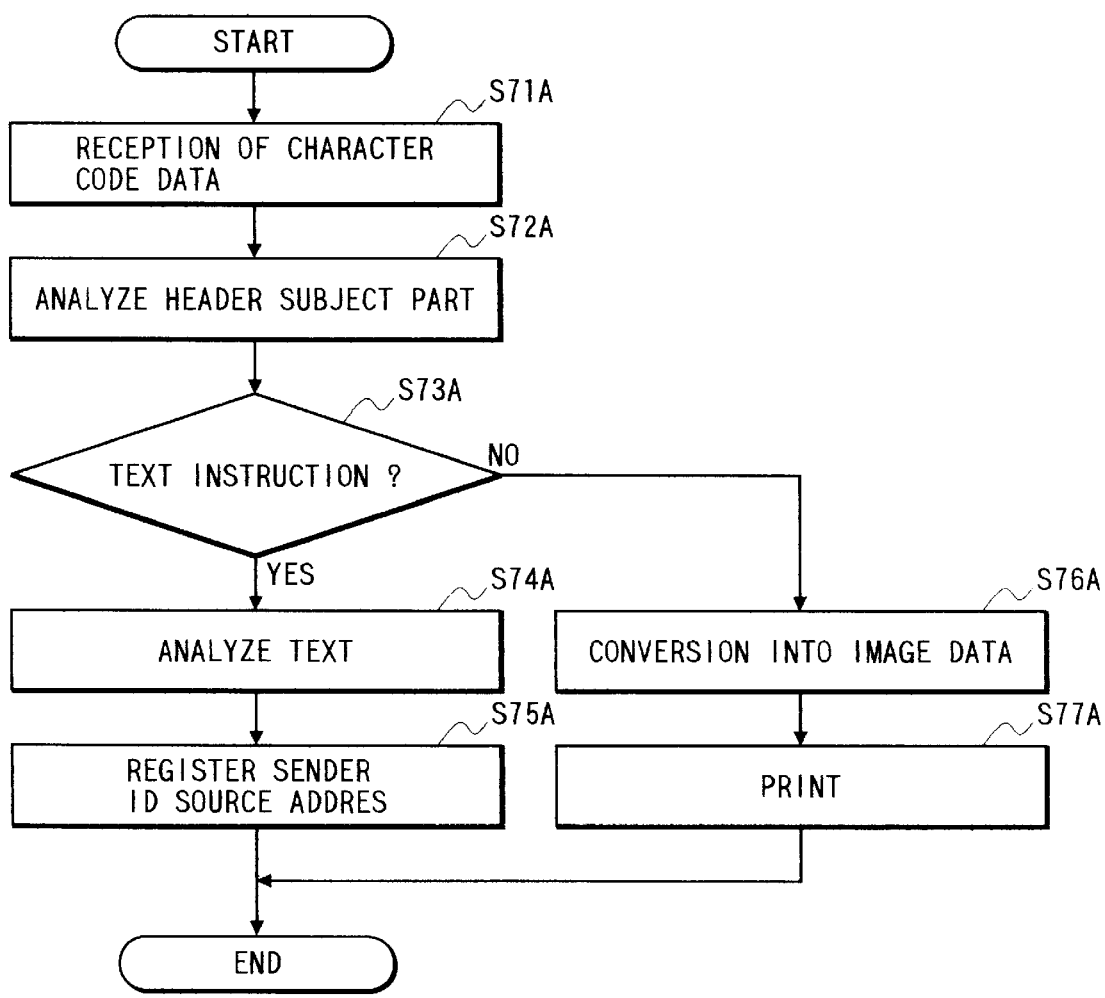
FIG. 22 is a flowchart of a first segment of a program for controlling a CPU in FIG. 21.

The CPU 1 operates in accordance with a program stored in the ROM 2. FIG. 22 is a flowchart of a first segment of the program. With reference to FIG. 22, a first step S71A in the first program segment decides whether or not character code data in an e-mail has been received by the LAN controller 9. In the case where the character code data in the e-mail has been received, the program advances from the step S71A to a step S72A. Otherwise, the program repeats the step S71A. Thus, the step S71A waits the reception of character code data in an e-mail. The step S72A analyzes the "Subject" part of the header of the e-mail.

A step S73A following the step S72A decides whether or not the "Subject" part of the header corresponds to a text instruction by referring to the result of the analysis by the step S72A. When the "Subject" part of the header corresponds to a text instruction, the program advances from the step S73A to a step S74A. Otherwise, the program advances from the step S73A to a step S76A.

The step S74A analyzes the text in the e-mail to extract ID information of a sender and information of a source address therefrom. A step S75A following the step S74A stores or registers the ID information of the sender and the information of the source address into the storage unit 4 in a manner such that the ID information of the sender and the information of the source address are in a given correspondence relation. After the step S75A, the current execution cycle of the first program segment ends.

The step S76A converts character code data in the text into corresponding image data. A step S77A following the step S76A transfers the image data to the printer 11. The step S77A activates the printer 11 so that the image data is visualized or printed out by the device 11. After the step S77A, the current execution cycle of the first program segment ends.

Figure 23:
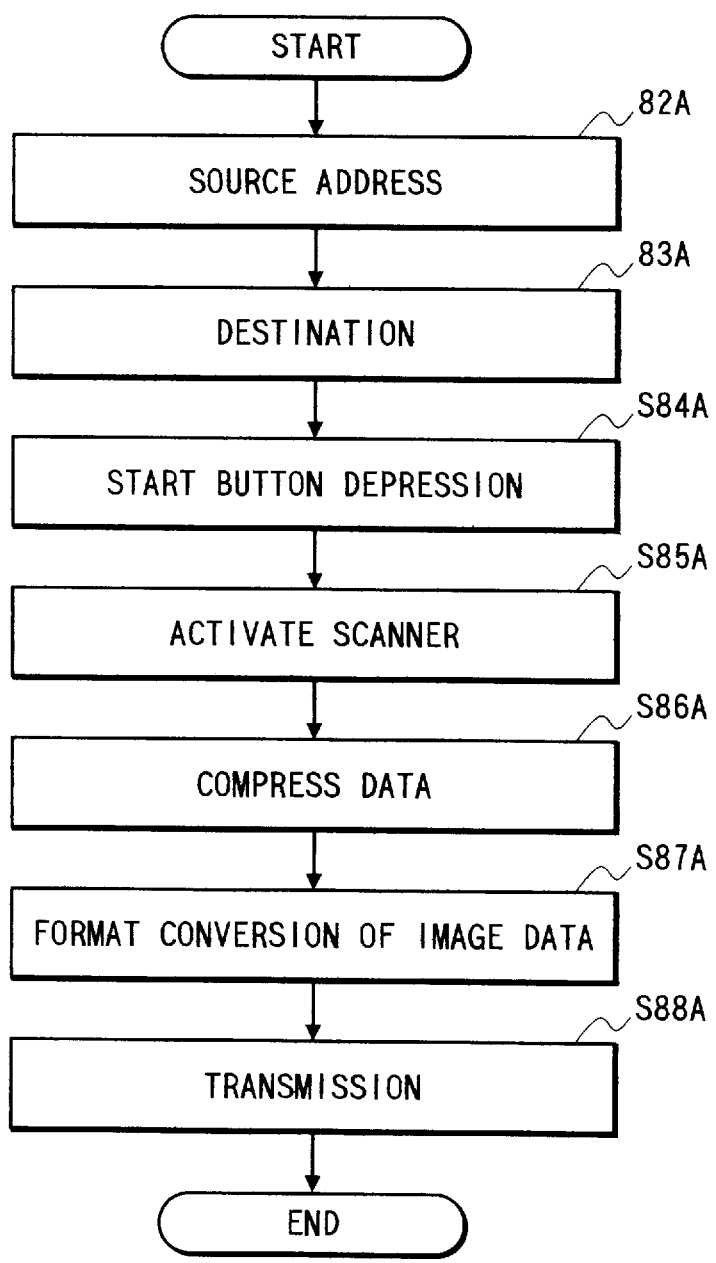
FIG. 23 is a flowchart of a second segment of the program for controlling the CPU in FIG. 21.

FIG. 23 is a flowchart of a second segment of the program. With reference to FIG. 23, a first step S82A of the second program segment decides whether or not ID information of a sender has been inputted by depressing the source button on the operation panel 7E. This decision is to wait the reception of sender ID information. In the case where the ID information of the sender has been inputted, the step S82A reads out information of a source address from the storage unit 4 which corresponds to the ID information of the sender. The step S82A transfers the information of the source address to the display on the operation panel 7E. The step S82A activates the display on the operation panel 7E so that the information of the source address is visualized thereby. Thus, it is possible to confirm the source address.

A step S83A following the step S82A decides whether or not information of the destination or the address of an e-mail to be transmitted has been inputted via the operation panel 7E. In the case where the information of the destination of an e-mail to be transmitted has been inputted, the program advances from the step S83A to a step S84A. Otherwise, the program repeats the step S83A. Thus, the step S83A waits the reception of the information of the destination.

The step S84A decides whether or not the start button on the operation panel 7E has been depressed. In the case where the start button on the operation panel 7E has been depressed, the program advances from the step S84A to a step S85A. Otherwise, the program repeats the step S84A. Thus, the step S84A waits the depression of the start button.

The step S85A activates the scanner 6 so that an image of the surface of a document sheet in the scanner 6 is converted by the scanner 6 into corresponding binary image data (corresponding bi-level image data).

A step S86A subsequent to the step S85A transfers the binary image data from the scanner 6 to the data compressor/expander 8A. Then, the step S86A activates the data compressor/expander 8A so that the binary image data is compressed by the device 8A into compression-resultant image data of a given facsimile format. Further, the step S86A transfers the compression-resultant image data of the facsimile format from the data compressor/expander 8A to the storage unit 4 before storing the compression-resultant image data of the facsimile format into the storage unit 4.

A step S87A following the step S86A transfers the compression-resultant image data of the facsimile format from the storage unit 4 to the format converter 5. In addition, the step S87A transfers the information of the source address and the information of the destination to the format converter 5. The step S87A activates the format converter 5 so that the compression-resultant image data of the facsimile format is converted by the device 5 into corresponding image data of the e-mail format. The image data of the e-mail format contains the information of the source address and the information of the destination. Further, the step S87A transfers the image data of the e-mail format from the format converter 5 to the storage unit 4 before storing the image data of the e-mail format into the storage unit 4.

A step S88A subsequent to the step S87A transfers the image data of the e-mail format from the storage unit 4 to the LAN controller 9. The step S88A activates the LAN controller 9 so that the image data of the e-mail format is further transferred from the LAN controller 9 to an e-mail computer 9A. The image data of the e-mail format, that is, an e-mail, is transmitted from the e-mail computer 9A to the destination via an e-mail network 9B. After the step S88A, the current execution cycle of the second program segment ends.

Eleventh Embodiment

An eleventh embodiment of this invention is similar to the embodiment of FIGS. 18–20 except for design changes described hereinafter.

In the eleventh embodiment, when ID information of a sender is inputted, a source address corresponding to the ID information of the sender is recognized. Information of the source address is automatically written into the header of an e-mail carrying image data.

Twelfth Embodiment

Figure 24:
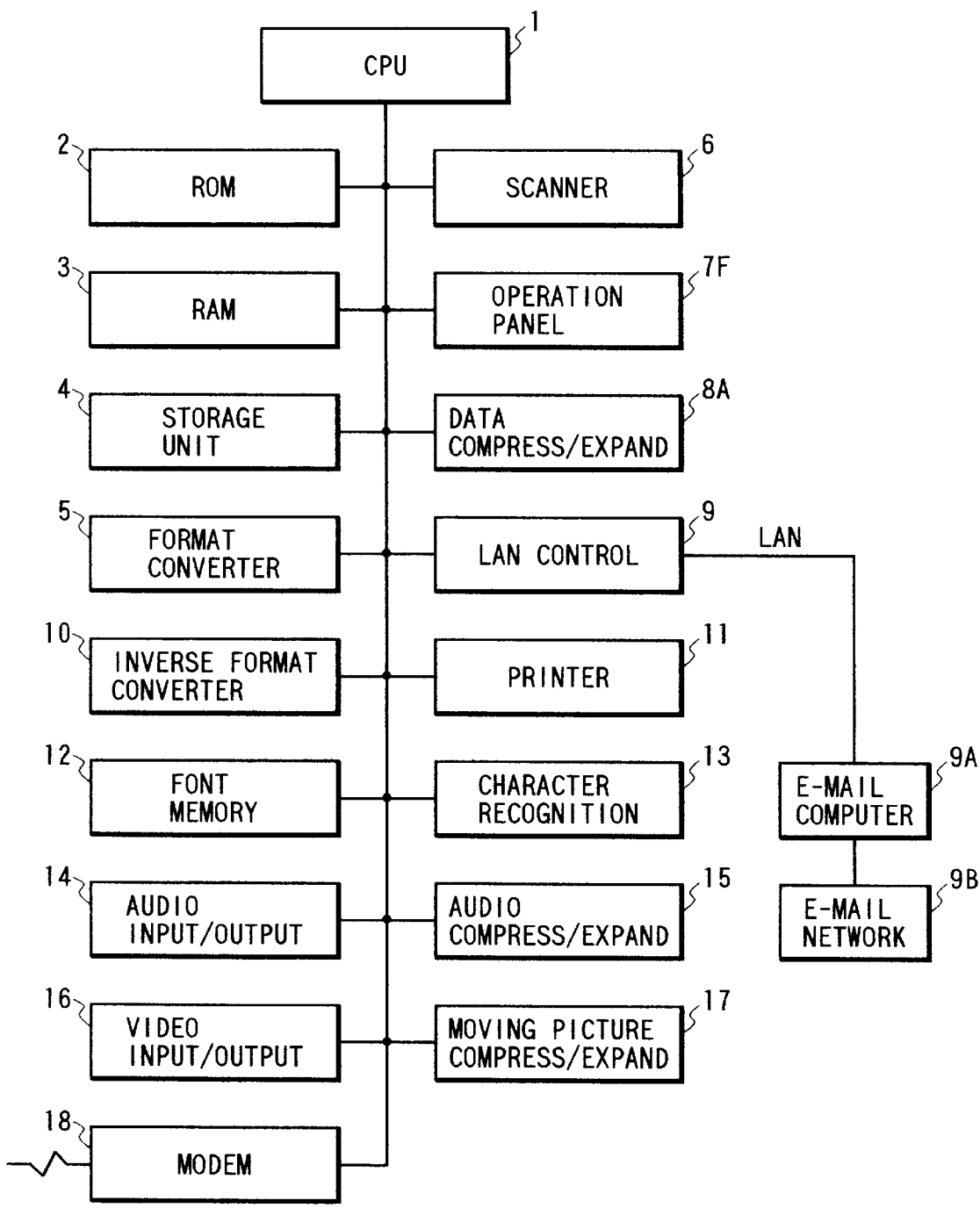
FIG. 24 is a block diagram of an electronic mail system according to a twelfth embodiment of this invention.

FIG. 24 shows a twelfth embodiment of this invention which is similar to the embodiment of FIGS. 14 and 15 except for design changes described hereinafter.

With reference to FIG. 24, an electronic mail system includes a CPU 1, a ROM 2, a RAM 3, a storage unit 4, a format converter 5, a scanner 6, an operation panel 7F, a data compressor/expander 8A, a LAN (local area network) controller 9, an inverse format converter 10, a printer 11, a font memory 12, a character recognition unit 13, an audio input/output device 14, an audio compressor/expander 15, a video input/output device 16, a moving-picture compressor/expander 17, and a modem 18 which are electrically connected via a bus line. The operation panel 7F replaces the operation panel 7C in FIG. 14. The operation panel 7F has a key board, a start button, a mode selection button, and other buttons. Information of the destination or the address of an e-mail to be transmitted can be inputted into the electronic mail system by operating the key board on the operation panel 7F. In addition, information of a destination telephone number can be inputted into the electronic mail system by operating the key board on the operation panel 7F. The scanner 6 can be activated by operating the start button on the operation panel 7F. Operation of the electronic mail system can be changed between an e-mail mode and a facsimile mode by operating the mode selection button on the operation panel 7F. The modem 18 is connected to a telephone line. The modem 18 serves to transmit and receive a facsimile signal to and from the telephone line.

Figure 25:
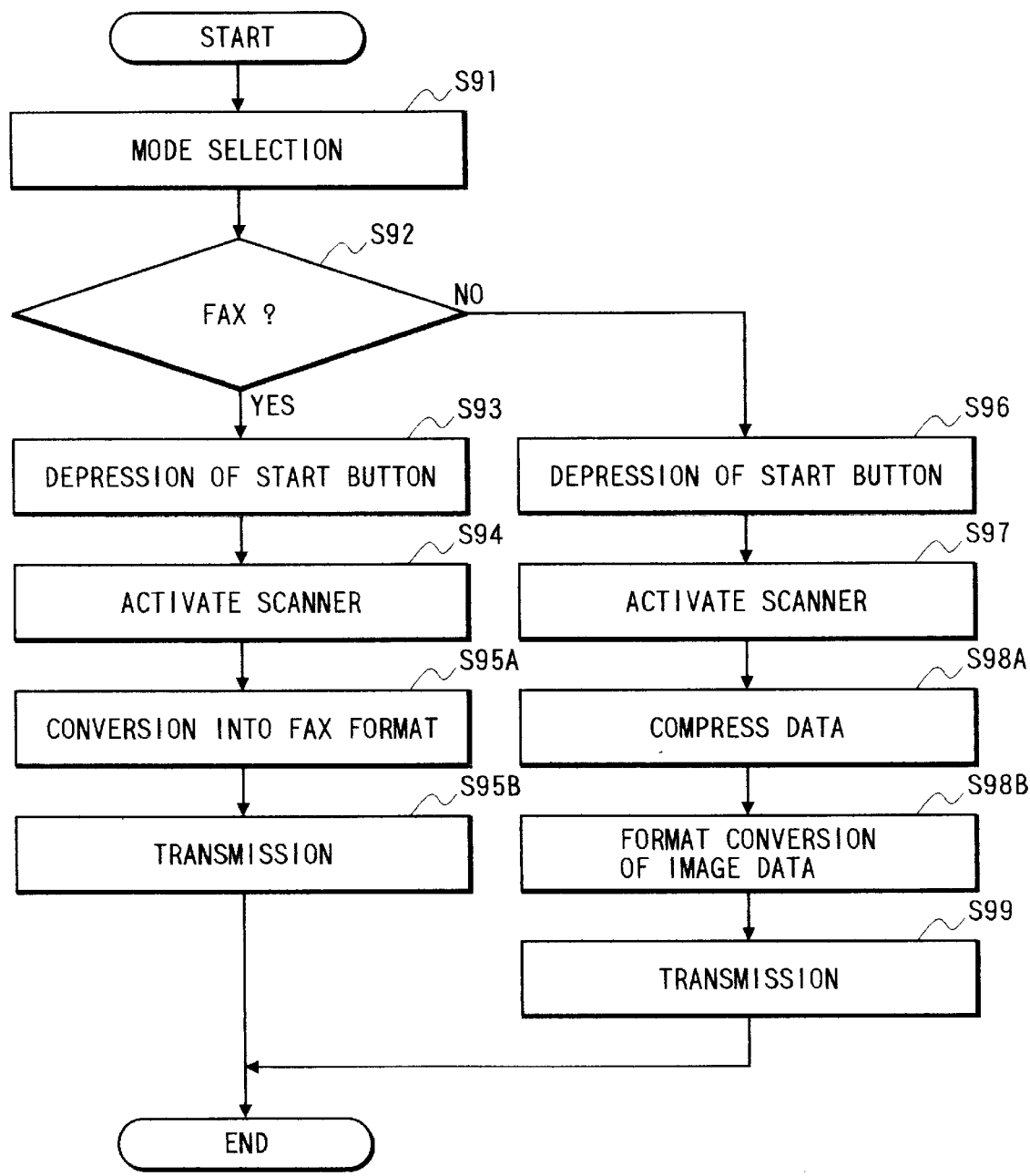
FIG. 25 is a flowchart of a segment of a program for controlling a CPU in FIG. 24.

The CPU 1 operates in accordance with a program stored in the ROM 2. FIG. 25 is a flowchart of a segment of the program. With reference to FIG. 25, a first step S91 in the program segment decides whether or not the mode selection button on the operation panel 7F has been operated. In the case where the mode selection button on the operation panel 7F has been operated, the program advances from the step S91 to a step S92. Otherwise, the program repeats the step S91. Thus, the step S91 waits operation of the mode selection button.

The step S92 decides which of the e-mail mode and the facsimile mode has been selected by referring to a signal coming from the mode selection button on the operation panel 7F. When the facsimile mode has been selected, the program advances from the step S92 to a step S93. When the e-mail mode has been selected, the program advances from the step S92 to a step S96.

The step S93 decides whether or not information of a destination telephone number has been inputted via the operation panel 7F. Also, the step S93 decides whether or not the start button on the operation panel 7F has been depressed. In the case where the information of the destination telephone number has been inputted and the start button on the operation panel 7F has been depressed, the program advances from the step S93 to a step S94. Otherwise, the program repeats the step S93. Thus, the step S93 waits the reception of information of a destination telephone number and the depression of the start button.

The step S94 activates the scanner 6 so that an image of the surface of a document sheet in the scanner 6 is converted by the scanner 6 into corresponding binary image data (corresponding bi-level image data). A step S95A following the step S94 transfers the binary image data from the scanner 6 to the data compressor/expander 8A. Then, the step S95A activates the data compressor/expander 8A so that the binary image data is compressed by the device 8 into compression-resultant image data of a given facsimile format.

A step S95B subsequent to the step S95A transfers the compression-resultant image data of the facsimile format from the data compressor/expander 8A to the modem 18. The step S95B activates the modem 18 so that the compression-resultant image data of the facsimile format (that is, the facsimile signal) is outputted from the modem 18 to the telephone line. Normally, the facsimile signal is transmitted via the telephone line to the communication opposite party identified by the destination telephone number. After the step S95B, the current execution cycle of the program segment ends.

The step S96 decides whether or not information of the destination or the address of an e-mail to be transmitted has been inputted via the operation panel 7F. In addition, the step S96 decides whether or not the start button on the operation panel 7F has been depressed. In the case where information of the destination of an e-mail to be transmitted has been inputted and the start button on the operation panel 7F has been depressed, the program advances from the step S96 to a step S97. Otherwise, the program repeats the step S96. Thus, the step S96 waits the reception of information of an e-mail destination and the depression of the start button.

The step S97 activates the scanner 6 so that an image of the surface of a document sheet in the scanner 6 is converted by the scanner 6 into corresponding binary image data (corresponding bi-level image data). A step S98A following the step S97 transfers the binary image data from the scanner 6 to the data compressor/expander 8A. Then, the step S98A activates the data compressor/expander 8A so that the binary image data is compressed by the device 8 into compression-resultant image data of a given facsimile format. Further, the step S98A transfers the compression-resultant image data of the facsimile format from the data compressor/expander 8A to the storage unit 4 before storing the compression-resultant image data of the facsimile format into the storage unit 4. In the case where the transmission of information on a plurality of document sheets (that is, a plurality of pages) is required, the document sheets are sequentially scanned by the device 6 and the compression-resultant image data of the facsimile format is stored into the storage unit 4 as a single file having a plurality of pages.

A step S98B following the step S98A transfers the compression-resultant image data of the facsimile format from the storage unit 4 to the format converter 5. The step S98B activates the format converter 5 so that the compression-resultant image data of the facsimile format is converted by the device 5 into corresponding image data of the e-mail format. In addition, the step S98B transfers the image data of the e-mail format from the format converter 5 to the storage unit 4 before storing the image data of the e-mail format into the storage unit 4.

A step S99 subsequent to the step S98B transfers the image data of the e-mail format from the storage unit 4 to the LAN controller 9. The step S99 activates the LAN controller 9 so that the image data of the e-mail format is further transferred from the LAN controller 9 to an e-mail computer 9A. The image data of the e-mail format, that is, an e-mail, is transmitted from the e-mail computer 9A to the destination via an e-mail network 9B. After the step S99, the current execution cycle of the program segment ends.

Thirteenth Embodiment

A thirteenth embodiment of this invention is similar to the embodiment of FIGS. 24 and 25 except for design changes described hereinafter.

Figure 26:
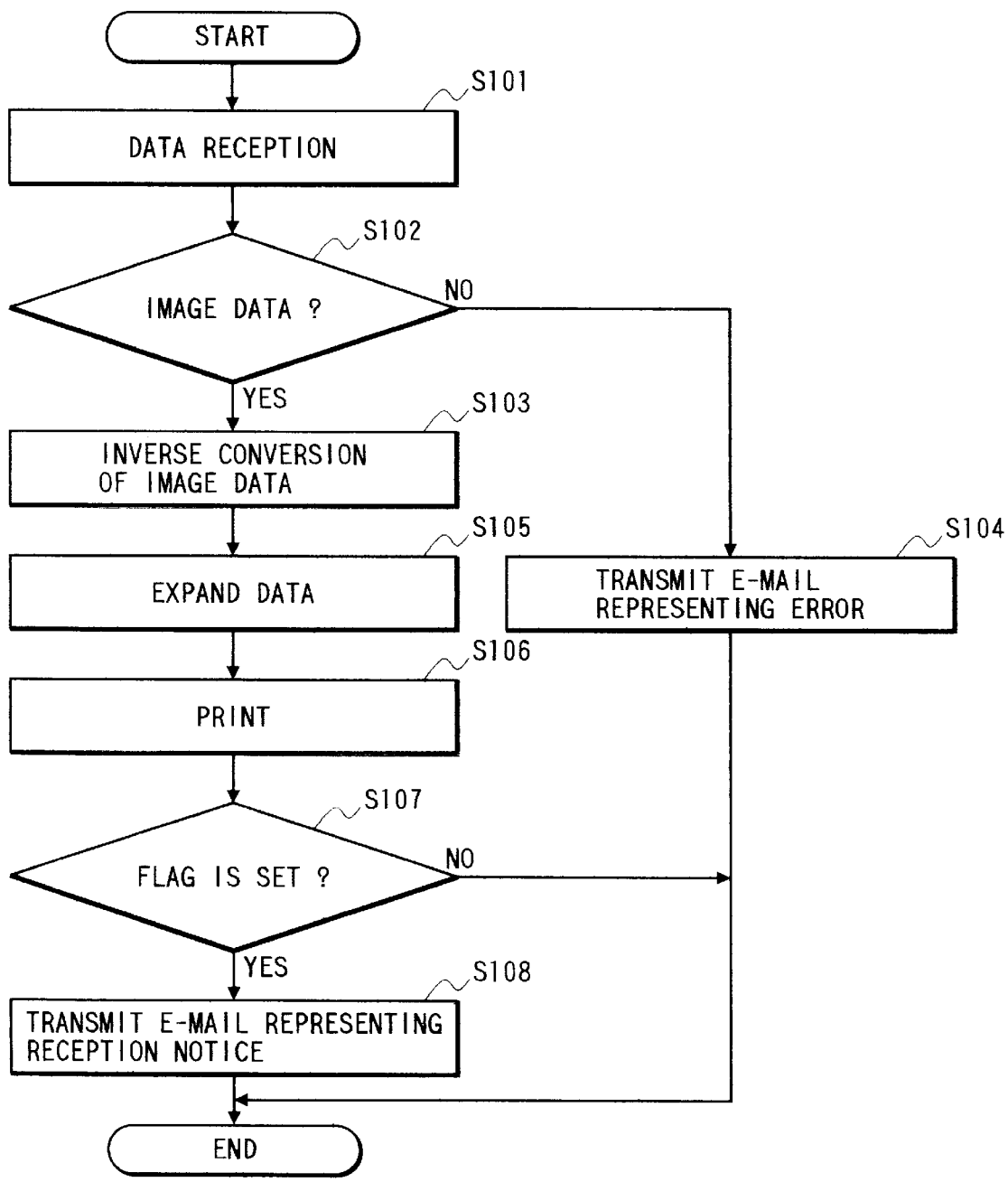
FIG. 26 is a flowchart of a segment of a program for controlling a CPU in an electronic mail system according to a thirteenth embodiment of this invention.

FIG. 26 is a flowchart of a segment of a program for controlling a CPU 1 (see FIG. 24) in the thirteenth embodiment. With reference to FIG. 26, a first step S101 in the program segment decides whether or not data of the e-mail format has been received by a LAN controller 9 (see FIG. 24). This decision is to wait the reception of data of the e-mail format. In the case where data of the e-mail format has been received, the step S101 transfers the received data of the e-mail format to a storage unit 4 (see FIG. 24). The step S101 controls the storage unit 4 so that the received data of the e-mail format is stored into the storage unit 4.

A step S102 following the step S101 decides whether or not the received data of the e-mail format agrees with image data of the e-mail format by referring to related information in the header of the received data of the e-mail format. When the received data 25 agrees with image data, the program advances from the step S102 to a step S103. When the received data differs from image data, the program advances from the step S102 to a step S104. The step S103 transfers the received data of the e-mail format from the storage unit 4 to an inverse format converter 10 (see FIG. 24). The step S103 activates the inverse format converter 10 so that the received data of the e-mail format is converted by the device 10 into corresponding image data of a given facsimile format. The step 104 controls a LAN controller 9 (see FIG. 24) so that a responsive e-mail representing an error will be transmitted to the source concerning the received data of the e-mail format. After the step S104, the current execution cycle of the program segment ends.

A step S105 following the step S103 transfers the image data of the facsimile format from the inverse format converter 10 to a data compressor/expander 8A (see FIG. 24). The step S105 activates the data compressor/expander 8A so that the image data of the facsimile format is expanded by the device 8A into expansion-resultant binary image data (expansion-resultant bi-level image data). Further, the step S105 transfers the expansion-resultant binary image data from the data compressor/expander 8A to the storage unit 4 before storing the expansion-resultant binary image data into the storage unit 4.

A step S106 subsequent to the step S105 transfers the expansion-resultant binary image data from the storage unit 4 to a printer 11 (see FIG. 24). The step S106 activates the printer 11 so that the expansion-resultant binary image data is visualized or printed out by the device 11.

A step S107 following the step S106 decides whether or not a reception waiting flag has been set. When the reception waiting flag has been set, the program advances from the step S107 to a step S108. Otherwise, the program exits from the step S107, and the current execution cycle of the program segment ends.

The step 108 controls the LAN controller 9 so that an e-mail representing a reception notice will be transmitted to a previously-registered terminal (a previously-registered terminal station). After the step S108, the current execution cycle of the program segment ends.

Setting the reception waiting flag is implemented by previously transmitting an e-mail in which a text has "!RCV SET" according to the format of FIG. 17. Resetting the reception waiting flag is implemented by transmitting an e-mail in which a text has "!RCV RESET" according to the format of FIG. 17.

Fourteenth Embodiment

A fourteenth embodiment of this invention is similar to the embodiment of FIGS. 24 and 25 except for design changes described hereinafter.

Figure 27:
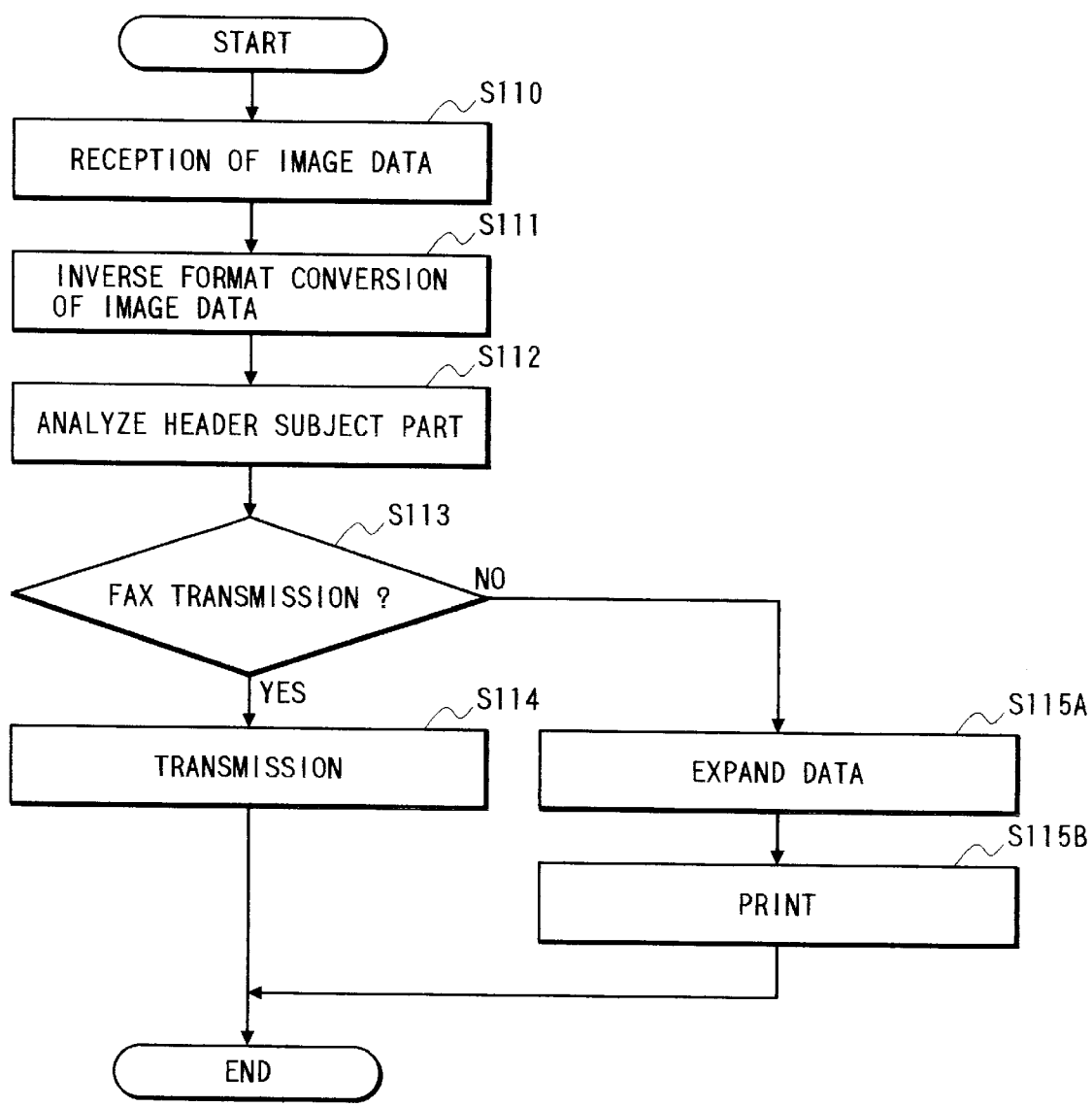
FIG. 27 is a flowchart of a segment of a program for controlling a CPU in an electronic mail system according to a fourteenth embodiment of this invention.

FIG. 27 is a flowchart of a segment of a program for controlling a CPU 1 (see FIG. 24) in the fourteenth embodiment. With reference to FIG. 27, a first step S110 in the program segment decides whether or not image data of the e-mail format (an e-mail) has been received by a LAN controller 9 (see FIG. 24). This decision is to wait the reception of image data of the e-mail format. In the case where image data of the e-mail format has been received, the step S110 transfers the received image data of the e-mail format to a storage unit 4 (see FIG. 24). The step S10 controls the storage unit 4 so that the received image data of the e-mail format is stored into the storage unit 4.

A step S111 following the step S110 transfers the received image data of the e-mail format from the storage unit 4 to an inverse format converter 10 (see FIG. 24). The step S111 activates the inverse format converter 10 so that the received image data of the e-mail format is converted by the device 10 into corresponding image data of a given facsimile format. Then, the step S111 transfers the image data of the facsimile format from the inverse format converter 10 to the storage unit 4 before storing the image data of the facsimile format into the storage unit 4.

A step S112 subsequent to the step S111 analyzes the "Subject" part of the header of the received e-mail. In the case where the analyzed "Subject" part of the header includes a requirement for facsimile transmission, the step S112 extracts information of a destination telephone number from a portion of the received e-mail which immediately follows the "Subject" part.

A step S113 following the step S112 decides whether or not a requirement for facsimile transmission is present. When a requirement for facsimile transmission is present, the program advances from the step S113 to a step S114. Otherwise, the program advances from the step S113 to a step S115A.

The step S114 transfers the image data of the facsimile format from the storage unit 4 to a modem 18 (see FIG. 24). The step S114 activates the modem 18 so that the image data of the facsimile format (that is, the facsimile signal) is outputted from the modem 18 to a telephone line. Normally, the facsimile signal is transmitted via the telephone line to the communication opposite party identified by the destination telephone number. After the step S114, the current execution cycle of the program segment ends.

A step S115A transfers the image data of the facsimile format from the storage unit 4 to a data compressor/expander 8A (see FIG. 24). The step S115A activates the data compressor/expander 8A so that the image data of the facsimile format is expanded by the device 8A into expansion-resultant binary image data (expansion-resultant bi-level image data). Further, the step S115A transfers the expansion-resultant binary image data from the data compressor/expander 8A to the storage unit 4 before storing the expansion-resultant binary image data into the storage unit 4.

A step S115B subsequent to the step S115A transfers the expansion-resultant binary image data from the storage unit 4 to a printer 11 (see FIG. 24). The step S115B activates the printer 11 so that the expansion-resultant binary image data is visualized or printed out by the device 11. After the step S115B, the current execution cycle of the program segment ends.

Fifteenth Embodiment

Figure 28:
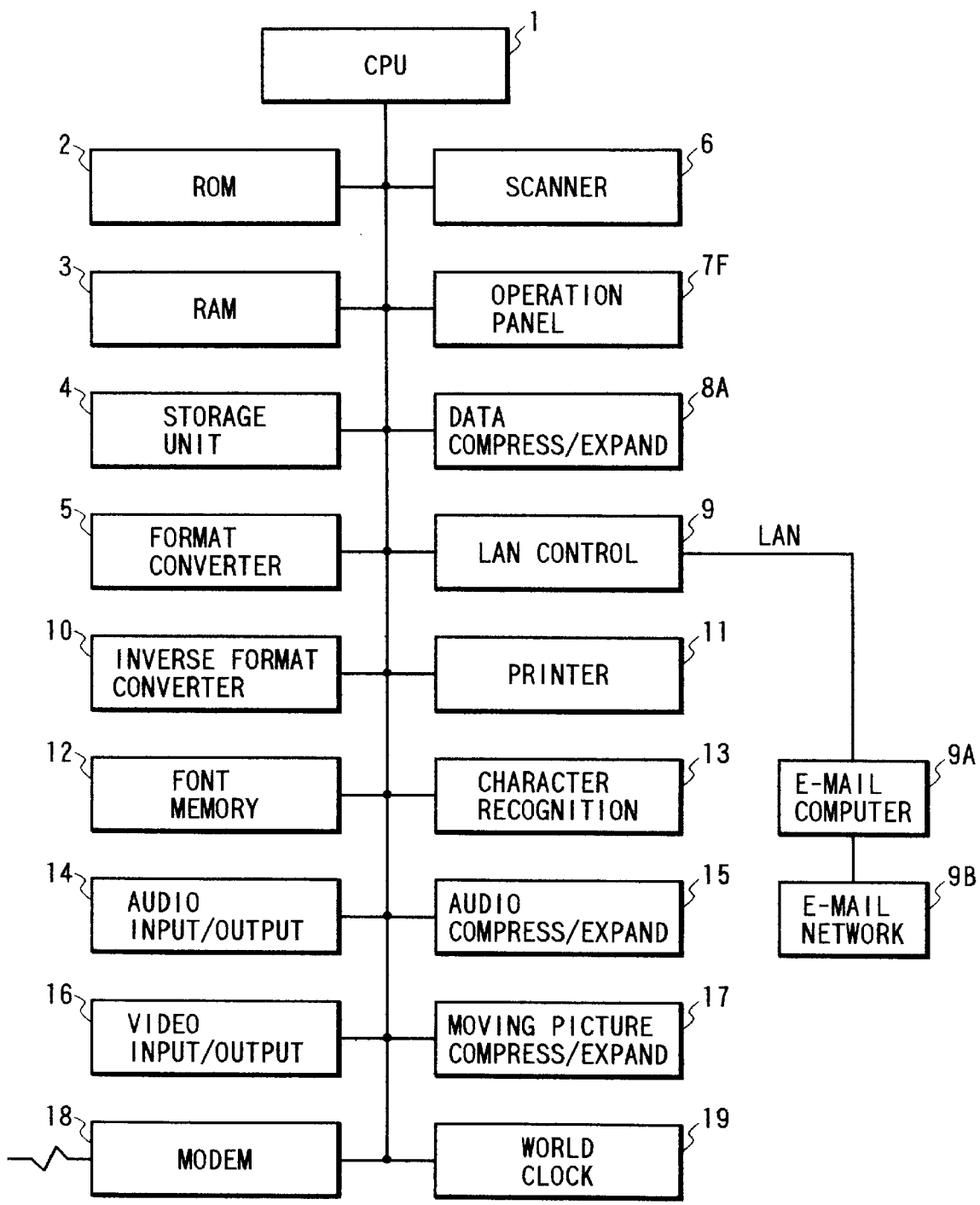
FIG. 28 is a block diagram of an electronic mail system according to a fifteenth embodiment of this invention.

FIG. 28 shows a fifteenth embodiment of this invention which is similar to the embodiment of FIGS. 24 and 25 except for an additional arrangement described hereinafter.

With reference to FIG. 28, an electronic mail system includes a CPU 1, a ROM 2, a RAM 3, a storage unit 4, a format converter 5, a scanner 6, an operation panel 7F, a data compressor/expander 8A, a LAN (local area network) controller 9, an inverse format converter 10, a printer 11, a font memory 12, a character recognition unit 13, an audio input/output device 14, an audio compressor/expander 15, a video input/output device 16, a moving-picture compressor/expander 17, a modem 18, and a world clock 19 which are electrically connected via a bus line. The world clock 19 generates information of standard time in every country in the world.

Figure 29:
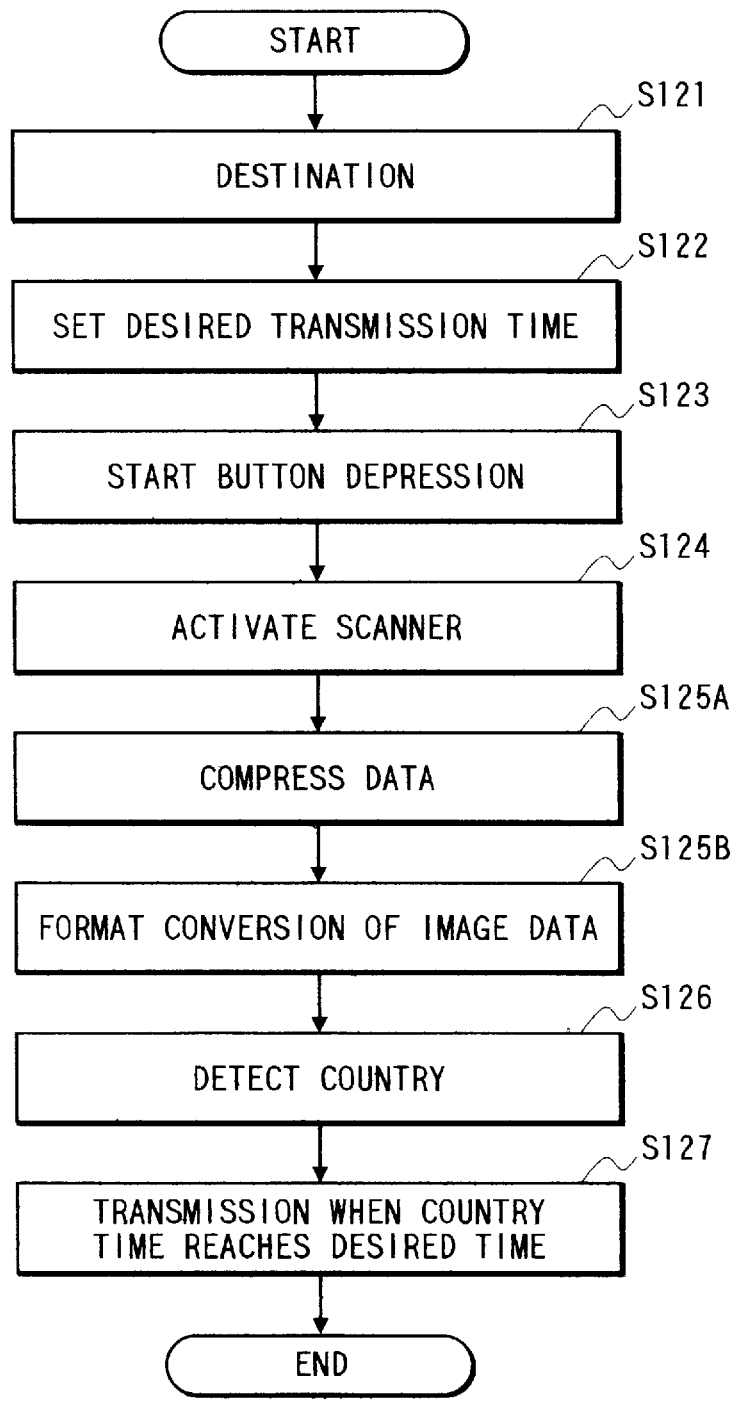
FIG. 29 is a flowchart of a segment of a program for controlling a CPU in FIG. 28.

The CPU 1 operates in accordance with a program stored in the ROM 2. FIG. 29 is a flowchart of a segment of the program. With reference to FIG. 29, a first step S121 in the program segment decides whether or not information of the destination or the address of an e-mail to be transmitted has been inputted via the operation panel 7F. In the case where the information of the destination of an e-mail to be transmitted has been inputted, the program advances from the step S121 to a step S122. Otherwise, the program repeats the step S121. Thus, the step S121 waits the reception of destination information.

The step S122 sets desired time for e-mail transmission which is expressed according to standard time in a country having an e-mail destination. A step S123 following the step S122 decides whether or not the start button on the operation panel 7F has been depressed. In the case where the start button on the operation panel 7F has been depressed, the program advances from the step S123 to a step S124. Otherwise, the program repeats the step S123. Thus, the step S123 waits the depression of the start button.

The step S124 activates the scanner 6 so that an image of the surface of a document sheet in the scanner 6 is converted by the scanner 6 into corresponding binary image data (corresponding bi-level image data). A step S125A following the step S124 transfers the binary image data from the scanner 6 to the data compressor/expander 8A. Then, the step S125A activates the data compressor/expander 8A so that the binary image data is compressed by the device 8A into compression-resultant image data of a given facsimile format. Further, the step S125A transfers the compression-resultant image data of the facsimile format from the data compressor/expander 8A to the storage unit 4 before storing the compression-resultant image data of the facsimile format into the storage unit 4.

A step S125B following the step S125A transfers the compression-resultant image data of the facsimile format from the storage unit 4 to the format converter 5. In addition, the step S125B transfers the information of the e-mail destination to the format converter 5. The step S125B activates the format converter 5 so that the compression-resultant image data of the facsimile format is converted by the device 5 into corresponding image data of the e-mail format. Further, the step S125B transfers the image data of the e-mail format from the format converter 5 to the storage unit 4 before storing the image data of the e-mail format into the storage unit 4.

A step S126 following the step S125B detects a destination's country from the information of the e-mail destination. It is well-known that an end part of information of an e-mail destination indicates the destination's country. A step S127 subsequent to the step S126 detects present time in the destination's country by referring to the information generated by the world clock 19. The step S127 decides whether or not the present time in the destination's country reaches the desired time for e-mail transmission. This decision is to wait a moment at which the present time in the destination's country reaches the desired time for e-mail transmission. In the case where the present time in the destination's country reaches the desired time for e-mail transmission, the step S127 transfers the image data of the e-mail format from the storage unit 4 to the LAN controller 9. The step S127 activates the LAN controller 9 so that the image data of the e-mail format is further transferred from the LAN controller 9 to an e-mail computer 9A. The image data of the e-mail format, that is, an e-mail, is transmitted from the e-mail computer 9A to the destination via an e-mail network 9B. After the step S127, the current execution cycle of the program segment ends.

Sixteenth Embodiment

A sixteenth embodiment of this invention is similar to the embodiment of FIGS. 24 and 25 except for design changes described hereinafter.

Figure 30:
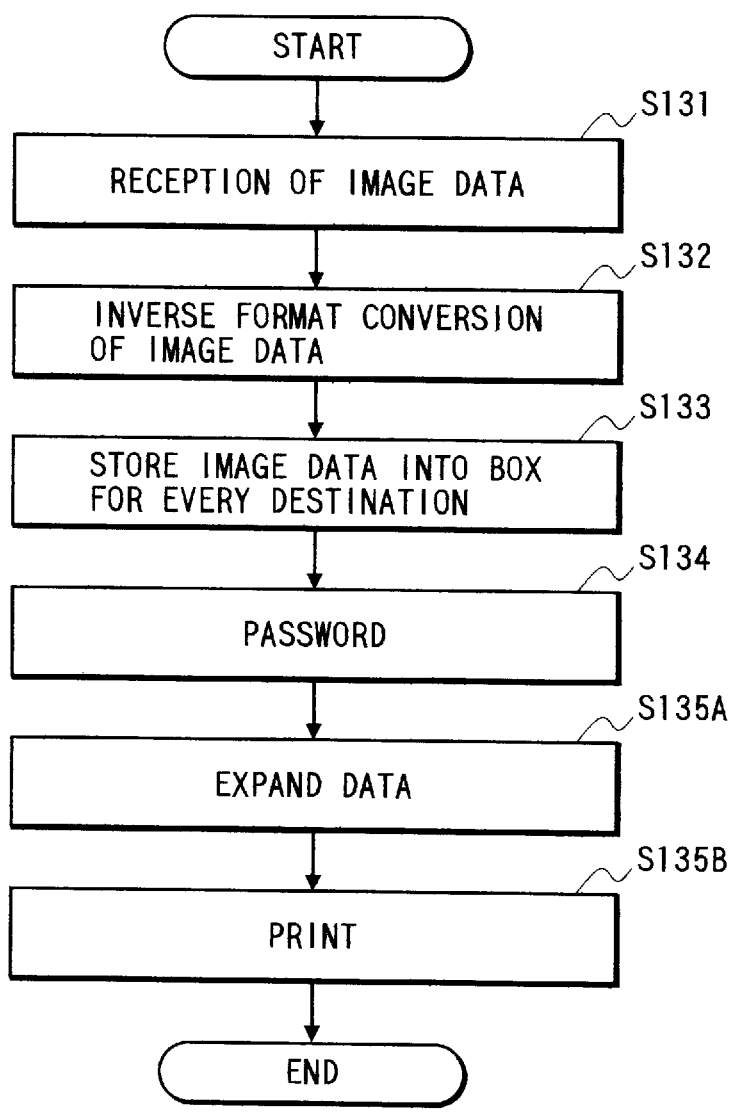
FIG. 30 is a flowchart of a segment of a program for controlling a CPU in an electronic mail system according to a sixteenth embodiment of this invention.

FIG. 30 is a flowchart of a segment of a program for controlling a CPU 1 (see FIG. 24) in the sixteenth embodiment. With reference to FIG. 30, a first step S131 in the program segment decides whether or not image data of the e-mail format (an e-mail) has been received by a LAN controller 9 (see FIG. 24). This decision is to wait the reception of image data of the e-mail format. In the case where image data of the e-mail format has been received, the step S131 transfers the received image data of the e-mail format to a storage unit 4 (see FIG. 24). The step S131 controls the storage unit 4 so that the received image data of the e-mail format is stored into the storage unit 4.

A step S132 following the step S131 transfers the received image data of the e-mail format from the storage unit 4 to an inverse format converter 10 (see FIG. 24). The step S132 activates the inverse format converter 10 so that the received image data of the e-mail format is converted by the device 10 into corresponding image data of the facsimile format.

A step S133 subsequent to the step S132 transfers the image data of the facsimile format from the inverse format converter 10 to the storage unit 4, and then storing the image data of the facsimile format into a box which is provided in the storage unit 4 for the related destination. It should be noted that boxes provided in the storage unit 4 have a correspondence relation with previously-registered owner's ID information and previously-registered pass words.

A step S134 following the step S133 decides whether or not owner's ID information and a pass word are inputted. This decision is to wait the reception of owner's ID information and a pass word. In the case where owner's ID information and a pass word are inputted, the step S134 decides whether or not the inputted owner's ID information and the inputted pass word are acceptable. In the case where the inputted owner's ID information and the inputted pass word are acceptable, the program advances from the step S134 to a step S135A. Otherwise, the current execution cycle of the program segment ends.

The step S135A reads out the image data of the facsimile format from the box in the storage unit 4 which corresponds to the inputted owner's ID information and the inputted pass word. The step S135A transfers the image data of the facsimile format to a data compressor/expander 8A (see FIG. 24). The step S135A activates the data compressor/expander 8A so that the image data of the facsimile format is expanded by the device 8A into expansion-resultant binary image data (expansion-resultant bi-level image data).

A step S135B subsequent to the step S135A transfers the expansion-resultant binary image data from the data compressor/expander 8A to a printer 11 (see FIG. 24). The step S135B activates the printer 11 so that the expansion-resultant binary image data is visualized or printed out by the device 11. After the step S135B, the current execution cycle of the program segment ends.

Seventeenth Embodiment

A seventeenth embodiment of this invention is similar to the embodiment of FIG. 30 except for design changes described hereinafter. In the seventeenth embodiment, the step S134 is omitted from the program segment of FIG. 30, and the step S133 is immediately followed by the step S135A.

Information of owner's cover sheet is previously registered in a related box of a storage unit 4 (see FIG. 24). The registration is implemented by using a scanner 6 (see FIG. 24) or transmitting an e-mail having a cover-sheet registering instruction.

In the seventeenth embodiment, the step S135B is modified so that information of a cover sheet is read out from the storage unit 4, and the information of the cover sheet is added to expansion-resultant binary image data. Accordingly, a combination of the cover-sheet information and the expansion-resultant binary image data is visualized or printed out by a printer 11 (see FIG. 24).

Eighteenth Embodiment

An eighteenth embodiment of this invention is similar to the embodiment of FIGS. 24 and 25 except for design changes described hereinafter.

Figure 31:
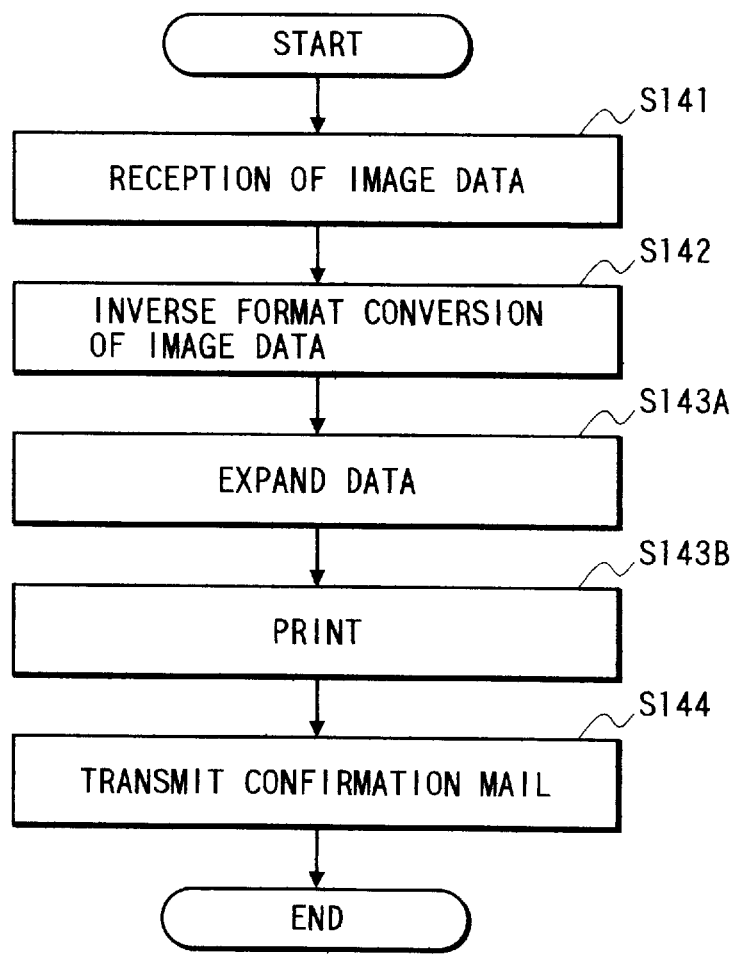
FIG. 31 is a flowchart of a segment of a program for controlling a CPU in an electronic mail system according to an eighteenth embodiment of is invention.

FIG. 31 is a flowchart of a segment of a program for controlling a CPU 1 (see FIG. 24) in the eighteenth embodiment. With reference to FIG. 31, a first step S141 in the program segment decides whether or not image data of the e-mail format (an e-mail) has been received by a LAN controller 9 (see FIG. 24). This decision is to wait the reception of image data of the e-mail format. In the case where image data of the e-mail format has been received, the step S141 transfers the received image data of the e-mail format to a storage unit 4 (see FIG. 24). The step S141 controls the storage unit 4 so that the received image data of the e-mail format is stored into the storage unit 4.

A step S142 following the step S141 transfers the received image data of the e-mail format from the storage unit 4 to an inverse format converter 10 (see FIG. 24). The step S142 activates the inverse format converter 10 so that the received image data of the e-mail format is converted by the device 10 into corresponding image data of a given facsimile format. The step S142 transfers the image data of the facsimile format to the storage unit 4 before storing the image data of the facsimile format into the storage unit 4.

A step S143A following the step S142 transfers the image data of the facsimile format from the storage unit 4 to a data compressor/expander 8A (see FIG. 24). The step S143A activates the data compressor/expander 8A so that the image data of the facsimile format is expanded by the device 8A into expansion-resultant binary image data (expansion-resultant bi-level image data).

A step S143B subsequent to the step S143A transfers the expansion-resultant binary image data from the data compressor/expander 8A to a printer 11 (see FIG. 24). The step S143B activates the printer 11 so that the expansion-resultant binary image data is visualized or printed out by the device 11.

A step S144 detects information of the address of a sender related to the received e-mail. The step 144 controls a LAN controller 9 (see FIG. 24) so that a responsive e-mail confirming e-mail reception will be transmitted to the sender address. After the step S144, the current execution cycle of the program segment ends.

Nineteenth Embodiment

A nineteenth embodiment of this invention is similar to the embodiment of FIGS. 24 and 25 except for design changes described hereinafter.

Figure 32:
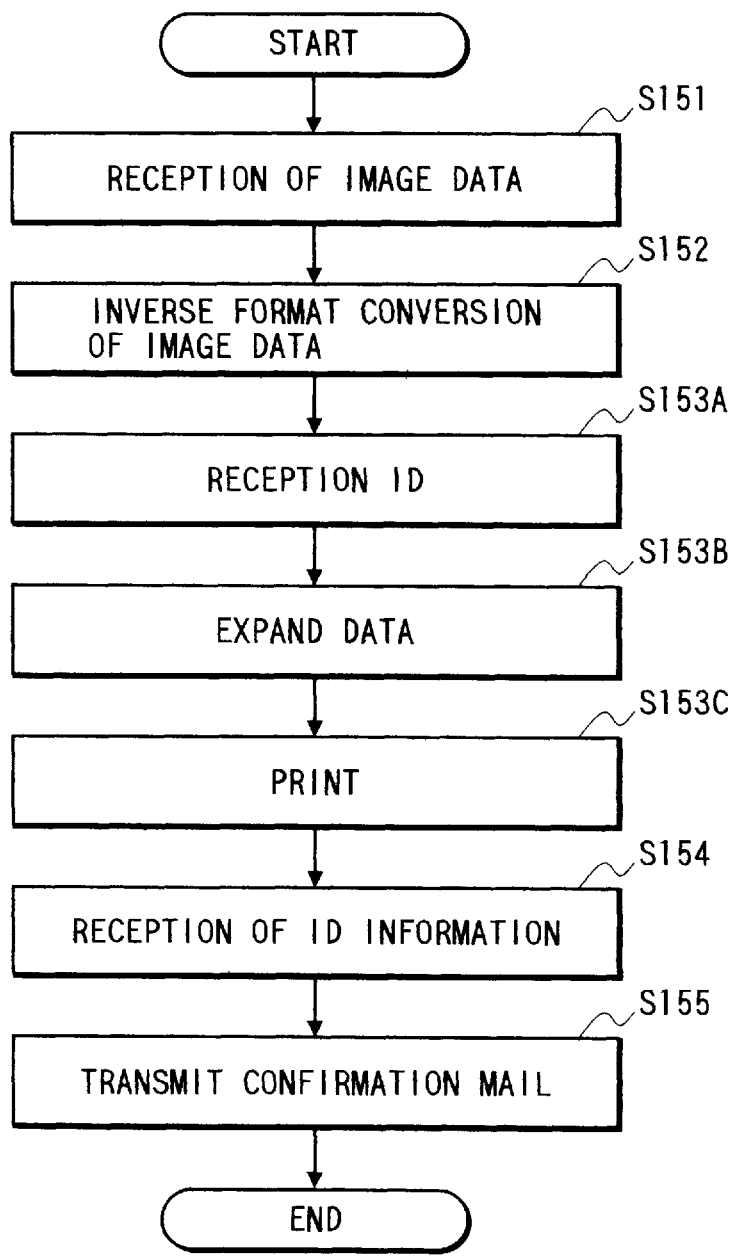
FIG. 32 is a flowchart of a segment of a program for controlling a CPU in an electronic mail system according to a nineteenth embodiment of is invention.

FIG. 32 is a flowchart of a segment of a program for controlling a CPU 1 (see FIG. 24) in the nineteenth embodiment. With reference to FIG. 32, a first step S151 in the program segment decides whether or not image data of the e-mail format (an e-mail) has been received by a LAN controller 9 (see FIG. 24). This decision is to wait the reception of image data of the e-mail format. In the case where image data of the e-mail format has been received, the step S151 transfers the received image data of the e-mail format to a storage unit 4 (see FIG. 24). The step S151 controls the storage unit 4 so that the received image data of the e-mail format is stored into the storage unit 4.

A step S152 following the step S151 transfers the received image data of the e-mail format from the storage unit 4 to an inverse format converter 10 (see FIG. 24). The step S152 activates the inverse format converter 10 so that the received image data of the e-mail format is converted by the device 10 into corresponding image data of a given facsimile format.

A step S153A following the step S152 adds reception ID information to the image data of the facsimile format. The reception ID information is generated on the basis of date and time unique for one year. The step S153A transfers the ID-added image data of the facsimile format to the storage unit 4 before storing the ID-added image data of the facsimile format into the storage unit 4.

A step S153B subsequent to the step S153A transfers the ID-added image data of the facsimile format from the storage unit 4 to a data compressor/expander 8A (see FIG. 24). The step S153B activates the data compressor/expander 8A so that the ID-added image data of the facsimile format is expanded by the device 8A into expansion-resultant binary image data (expansion-resultant bi-level image data).

A step S153C subsequent to the step S153B transfers the expansion-resultant binary image data from the data compressor/expander 8A to a printer 11 (see FIG. 24). The step S153C activates the printer 11 so that the expansion-resultant binary image data is visualized or printed out by the device 11.

A step S154 following the step S153C decides whether or not information equal to the reception ID information added to the image data has been inputted via an operation panel 7F (see FIG. 24). In the case where such reception ID information has been inputted, the program advances from the step S154 to a step S155. Otherwise, the program repeats the step S154. Thus, the step S154 waits the reception of the ID information.

The step S155 analyzes the header of the received e-mail, and thereby detects a sender address corresponding to the reception ID information. The step S155 controls a LAN controller 9 (see FIG. 24) so that a responsive confirmation e-mail will be transmitted to the sender address. After the step S155, the current execution cycle of the program segment ends.

Twentieth Embodiment

A twentieth embodiment of this invention is similar to the embodiment of FIGS. 24 and 25 except for design changes described hereinafter.

Figure 33:
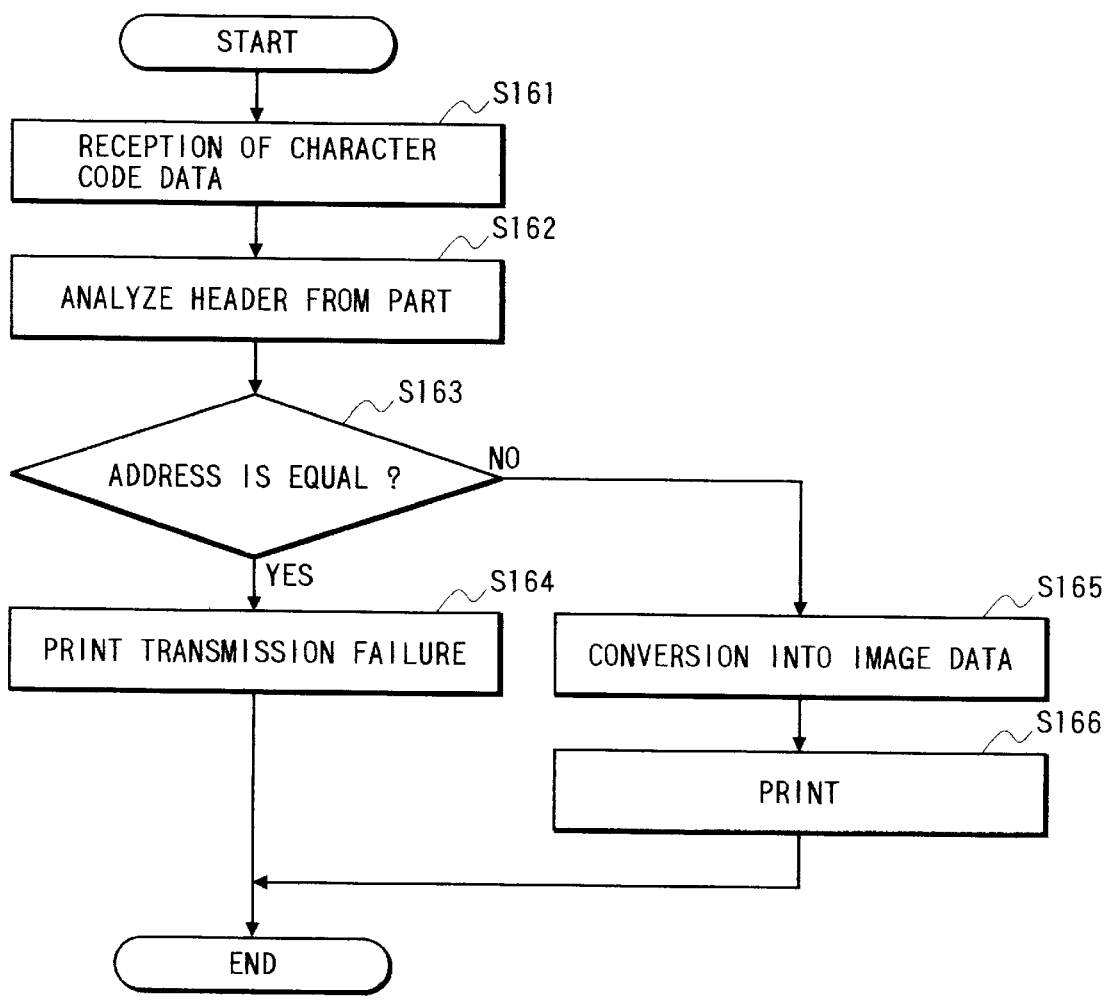
FIG. 33 is a flowchart of a segment of a program for controlling a CPU in an electronic mail system according to a twentieth embodiment of this invention.

FIG. 33 is a flowchart of a segment of a program for controlling a CPU 1 (see FIG. 24) in the twentieth embodiment. With reference to FIG. 33, a first step S161 in the program segment decides whether or not character code data in an e-mail has been received by a LAN controller 9 (see FIG. 24). This decision is to wait the reception of character code data in an e-mail. In the case where the character code data in the e-mail has been received, the program advances from the step S161 to a step S162. The step S162 analyzes the "From" part of the header of the e-mail to detect a sender address.

A step S163 following the step S162 decides whether or not the sender address agrees with a given address assigned to the present e-mail system. When the sender address agrees with the given address, the program advances from the step S163 to a step S164. Otherwise, the program advances from the step S163 to a step S165.

The step S164 transfers a signal indicative of a transmission failure to a printer 11 (see FIG. 24). The step S164 activates the printer 11 so that the transmission failure signal is visualized or printed out by the device 11. After the step S164, the current execution cycle of the program segment ends.

The step S165 converts character code data in the text into corresponding image data. A step S166 following the step S165 transfers the image data to the printer 11. The step S1 66 activates the printer 11 so that the image data is visualized or printed out by the device 11. After the step S166, the current execution cycle of the program segment ends.

Other Embodiments

Any one of the second embodiment to the twentieth embodiment may be modified to indicate character code data in the received e-mail on a display such as a CRT. The CRT may also be used to indicate moving pictures.

At least two of the first embodiment to the twentieth embodiment may be combined into an electronic mail system.

What is claimed is:

1. A facsimile which automatically receives facsimile data transmitted from a sender and sends image data of a paper document to an addressed destination, comprising:

an operation panel having a start-key to start a transmitting operation and an inputting key to input an electronic mail destination address;

a scanner for scanning a paper document and converting the paper document into image data;

compression means for compressing the scanned image data;

a facsimile transmitting and receiving unit which negotiates with a sender or destination facsimile before receiving or transmitting image data, for transmitting the compressed image data in a facsimile format to the destination facsimile via the telephone network and receiving a compressed image data in the facsimile format from the sender via the telephone network;

a first data converting means for converting the compressed image data into an electronic-mail format;

electronic-mail transmitting means for transmitting the compressed image data converted into the electronic-mail format to a destination address inputted from said inputting key on a network in which transmitting and receiving of an electronic-mail is possible;

electronic mail receiving means for receiving the image data converted into the electronic mail format from a sender via a communication network;

a second data converting means for converting the image data into facsimile format;

expansion means for expanding compressed image data which includes the image data received by said facsimile transmitting and receiving unit and a compressed image data converted by said second data converting means; and a printer for printing the image data expanded by said expansion means;

wherein said operation panel, said scanner, said compression means, facsimile transmitting and receiving unit, said first data converting means, said electronic mail transmitting means, said electronic mail receiving means, said second data converting means, said expansion means and said printer are integrated into said facsimile machine, and said scanner, said compression means, said first data converting means and said electronic mail transmitting means are sequentially operated in the order for transmit the image data in electronic mail format when said start-key is pushed after setting the paper document on said scanner and the finishing the input of the destination address of an electronic mail.

2. The facsimile mail apparatus of claim 1, further comprising:

data format recognizing means for recognizing a data format from the header part of the received electronic-mail; and a second expanding means for expanding data received by said electronic-mail receiving means according to the recognized data format.

3. The facsimile mail apparatus of claim 1, further comprising: detecting means for detecting a specific character code sequence from the electronic-mail received by said electronic-mail receiving means; and command executing mean for extracting a command from the received electronic-mail and for executing a process corresponding to the command when the specific character code sequence is detected.

4. The facsimile mail apparatus of claim 3, wherein said command executing means extracts a list of destination addresses from the received electronic-mail, and stores the list of destination addresses in a memory when the character code sequence indicates a request to register the list of destination addresses.

5. The facsimile mail apparatus of claim 3, further comprising:

facsimile transmitting and receiving means for transmitting the image data by facsimile communication via the telephone network and for receiving the image data by facsimile communication via the telephone line;

detecting means for detecting a character code sequence from the received electronic-mail indicating an instruction to forward mail by facsimile;

telephone-number detection means for detecting a telephone number from the received electronic-mail to forward the electronic mail;

means for converting the image data of the received electronic mail into facsimile format by said second converting means; and forwarding means for enabling the facsimile transmitting and receiving means to transmit the image data converted into the facsimile format to a destination identified by the telephone number.

6. The facsimile mail apparatus of claim 3 further comprising a memory in which an electronic-mail sender address is stored, and said command executing means extracts the electronic-mail sender address from the character code of the received electronic-mail and stores the electronic-mail sender address in the memory in the case where the character code sequence indicates a request to register an electronic-mail sender address.

7. The facsimile mail apparatus of claim 6, wherein said command executing means correlates the detected sender ID with the extracted sender address and stores the detected sender ID and the extracted sender address in the memory.

8. The facsimile mail apparatus of claim 3, wherein the apparatus has a memory in which an electronic-mail address of each user who wants notification of reception of sent electronic mail is stored, said command executing means extracting a mail address for reception notification from the character code of the received electronic-mail and storing the mail address in the memory when the character code sequence indicates a mail address for receiving said notification.

9. The facsimile mail apparatus of claim 8, further comprising:

reception notifying means for enabling said electronic-mail transmitting means to transmit the reception notification to the electronic-mail address when the received facsimile data includes the electronic-mail address stored in the memory.

10. The facsimile mail apparatus of claim 1, further comprising: means for inputting the sender address of the sender of said image date; and result notifying means for notifying a transmitting result to the sender address using said electronic-mail transmitting means when the electronic-mail of image data is transmitted by said electronic-mail transmitting means.

11. The facsimile mail apparatus of claim 1, further comprising:

a memory for storing an electronic-mail address of each user who wants to receive notification of the electronic mail delivery; and reception notifying means for sending notice of the reception of the electronic-mail to the electronic-mail address stored in memory by using said electronic-mail transmitting means.

12. The facsimile data apparatus of claim 1, further comprising:

transmission result notifying means for detecting a result of facsimile transmitting by using said facsimile transmitting and receiving means, and for transmitting the detected transmission result to a designated terminal on said communication network by using the electronic-mail transmitting means.

13. The facsimile mail apparatus of claim 1, further comprising: reception notifying means for detecting that the data to be printed by said printing means, was received by said facsimile transmitting and receiving means and for transmitting the detection result to a designated terminal in said communication network by using the electronic-mail transmitting means.

14. The facsimile mail apparatus of claim 1, further comprising:

transferring means for converting the electronic-mail format of the image data received by said electronic-mail receiving means into the facsimile format, and for transferring the image data converted into the facsimile format to a destination of a designated telephone number using said facsimile transmitting and receiving means in response to an order to transfer image data by facsimile received from electronic mail.

15. The facsimile mail apparatus of claim 14, wherein said transferring means extracts an order transfer and the designated telephone number from the received electronic-mail.

16. The facsimile mail apparatus of claim 1, further comprising:

means for inputting the electronic-mail sender address of the sender;

result notifying means for forwarding the transmission result to the electronic-mail sender address by said electronic-mail transmitting means when the electronic-mail of said image data is transmitted by said electronic-mail transmitting means.

17. The facsimile mail apparatus of claim 1, further comprising:

a memory in which an electronic-mail sender address is registered;

detecting means for detecting a character code sequence from the electronic-mail received by said electronic-mail receiving means; and command executing means for extracting the electronic-mail sender address from the character sequence of the received mail and for registering an address of the electronic-mail sender into the memory when the character code sequence is detected from the received electronic-mail.

18. The facsimile mail apparatus of claim 1, further comprising:

a memory in which an electronic-mail address for acknowledging receipt of an electronic message is stored;

detecting means for detecting a character code sequence requesting notification of reception of the electronic-mail received by said electronic-mail receiving means;

command executing means for extracting the electronic-mail address for reception notification from the character sequence of the received mail and register the electronic-mail address for reception notification into the memory.

19. The facsimile mail apparatus of claim 1, further comprising:

means for detecting a character code sequence indicating a transfer by facsimile from electronic mail received by said electronic-mail receiving means;

telephone-number detecting means for detecting the telephone number from said received electronic mail; and controlling means for transferring the image data converted into facsimile format from electronic-mail format received by said electronic mail receiving means to a line representing the detected telephone number by using said facsimile transmitting and receiving means.

20. The facsimile mail apparatus of claim 1, further comprising:

means for identifying a country of the sender from the inputted destination address;

means for providing a standard time in any country throughout the world from a determined present time;

a memory in which the sender time from any country throughout the world is stored as the standard time in the country; and means for transmitting the data according to the standard time in the identified country.

21. The facsimile mail apparatus of claim 1, further comprising:

means for storing a plurality of electronic-mail addresses;

means for storing and managing image data transmitted by electronic-mail for each of the electronic-mail addresses;

means for setting a pass word for each of electronic-mail addresses; and means for outputting the stored image data when the pass word is inputted.

22. The facsimile mail apparatus of claim 21, further comprising:

means for adding a cover sheet in which at least each electronic-mail address is described for each electronic-mail address and printing it.

23. The facsimile mail apparatus of claim 1, further comprising:

means for inputting and outputting audio data;

means for integrating audio data and image data into integration-resultant data and means for transmitting and receiving the integration resultant data as a single electronic-mail.

24. The facsimile mail apparatus of claim 1, further comprising:

means for inputting moving-picture data;

means for integrating moving-picture data and image data into integration-resultant data; and means for transmitting the integration-resultant data as a single electronic-mail.

25. A facsimile mail apparatus comprising:

a scanner for scanning a document and converting the document into image data;

address inputting means for inputting an electronic-mail destination address;

compression means for compressing the scanned image data;

a first data converting means for converting the compressed image data into an electronic-mail format;

electronic-mail transmitting means for transmitting the image data converted into the electronic-mail format to the destination address over a network in which transmitting and receiving of electronic-mail is possible;

a start-key means for allowing a transmitting operation to start;

transmitting controlling means for operating said scanner, said compression means, said converting means and said electronic-mail transmitting means when said start-key means is enabled;

electronic-mail receiving means for receiving the electronic-mail image data via the network in which transmitting and receiving of electronic-mail is possible;

a second data converting means for converting the received electronic-mail image data into facsimile data format;

a first expanding means for expanding the image data converted into the facsimile data format;

printing means for printing the expanded facsimile data format image data detecting means for detecting a specific character code sequence from the electronic-mail received by said electronic-mail receiving means;

command executing mean for extracting a command from the received electronic-mail and for executing a process corresponding to the command when the specific character code sequence is detected, including extracting a list of destination addresses from the received electronic-mail, and storing the list of destination addresses in a memory when the character code sequence indicates a request to register the list of destination addresses;

wherein said detecting means detects a sender ID from the received mail, to identify the sender of the received mail, and said command executing means correlates the detected sender ID with the extracted list of destination address and stores the detected sender ID with the extracted list of destination addresses in the memory.

26. The facsimile mail apparatus of claims 25, further comprising:

means for inputting the sender ID of the sender who is going to send image data via the communication network in which transmitting and receiving electronic-mail is possible;

identifying means for identifying an inputted sender ID with a sender ID stored in the memory;

display means for displaying the registered list of destination address correlated with the sender ID when the identified sender ID is registered in the memory; and selection means for selecting the destination address from the list of destination addresses displayed by said displaying means.

27. A facsimile mail apparatus comprising:

a scanner for scanning a document and converting the document into image data;

address inputting means for inputting an electronic-mail destination address;

compression means for compressing the scanned image data;

a first data converting means for converting the compressed image data into an electronic-mail format;

electronic-mail transmitting means for transmitting the image data converted into the electronic-mail format to the destination address over a network in which transmitting and receiving of an electronic-mail is possible;

a start-key means for allowing a transmitting operation to start;

transmitting controlling means for operating said scanner said compression means, said converting means and said electronic-mail transmitting means when said start-key means is enabled;

electronic-mail receiving means for receiving the electronic-mail image data via the network in which transmitting and receiving of electronic-mail is possible;

a second data converting means for converting the received electronic-mail image data into facsimile data format;

a first expanding means for expanding the image data converted into the facsimile data format;

printing means for printing the expanded facsimile data format image data;

detecting means for detecting a specific character code sequence from the electronic-mail received by said electronic-mail receiving means;

a memory for storing an address of an electronic mail sender;

command executing mean for extracting a command from the received electronic-mail and for executing a process corresponding to the command when the specific character code sequence is detected, including extracting the electronic-mail sender address from said character code sequence and storing the electronic-mail sender address in the memory when the character code sequence indicates a request to register an electronic-mail sender address;

wherein said command executing means correlates the detected sender ID with the extracted sender address and stores the detected sender ID and the extracted sender address in the memory; and means for inputting the sender ID of the sender who is sending image data via the communication network in which transmitting and receiving of an electronic-mail is possible;

identifying means for identifying the inputted sender ID with the sender ID stored in the memory;

reading means for reading the registered sender address correlated with the sender ID from the memory after said sender is identified by said identifying means; and writing means for writing the read sender address in the header of the electronic-mail of image data to be sent over said communication network.

* * * * *